(12) United States Patent
Kitamura

(10) Patent No.: US 6,862,426 B2
(45) Date of Patent: Mar. 1, 2005

(54) SHEET FEEDING MECHANISM AND IMAGE FORMING APPARATUS

(75) Inventor: Makoto Kitamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 10/373,499

(22) Filed: Feb. 24, 2003

(65) Prior Publication Data

US 2003/0179360 A1 Sep. 25, 2003

(30) Foreign Application Priority Data

Mar. 20, 2002 (JP) ........................................ 2002-078694

(51) Int. Cl.$^7$ ............................................... G03G 15/00
(52) U.S. Cl. ...................... 399/393; 399/381; 400/624; 271/145
(58) Field of Search ............................... 399/111, 393, 399/381; 271/22, 126, 147, 145; 400/624, 625, 627, 628, 629

(56) References Cited

U.S. PATENT DOCUMENTS

| 5,177,544 | A | * | 1/1993 | Kimura et al. ................ 399/16 |
| 5,634,188 | A | * | 5/1997 | Johnston et al. ............. 399/393 |
| 5,897,112 | A | * | 4/1999 | Kwag ............................ 271/38 |
| 6,246,466 | B1 | * | 6/2001 | Hirano et al. ................ 355/407 |
| 6,382,623 | B1 | * | 5/2002 | Gibson ........................ 271/157 |
| 6,406,201 | B1 | * | 6/2002 | Beretta et al. ............... 400/605 |
| 6,443,445 | B1 | * | 9/2002 | Bortolotti .................... 271/117 |
| 6,540,221 | B2 | * | 4/2003 | Nakashima et al. ......... 271/121 |

* cited by examiner

Primary Examiner—Andrew H. Hirshfeld
Assistant Examiner—Dave A. Ghatt
(74) Attorney, Agent, or Firm—Akin Gump Strauss Hauer & Feld LLP

(57) ABSTRACT

A tray 1 can be inserted in and pulled out of a main body 10 of an image forming apparatus. A lifting member 23 is provided in the main body 10 so that the lifting member 23 is able to enter into the tray 1 and lift a stack of sheets in the tray 1. The lifting member 23 is driven by a motor 25 provided in the main body 10. A switching member 27 is provided for connecting and disconnecting the transmission of the power of the motor 25 to the lifting member 23. When the tray 1 is fully inserted in the main body 10, the switching member 27 connects the transmission. In contrast, when the tray 1 is to be moved out of the main body 10, the switching member 27 disconnects the transmission, so that the lifting member 23 swings downward out of the tray 1.

25 Claims, 21 Drawing Sheets

FIG.23
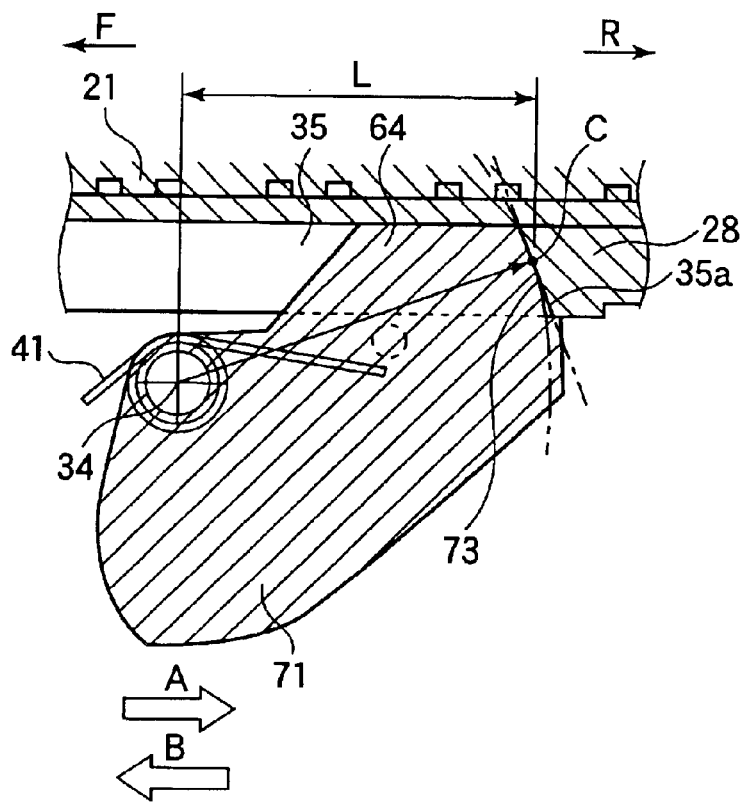
FIG.24A
FIG.24B
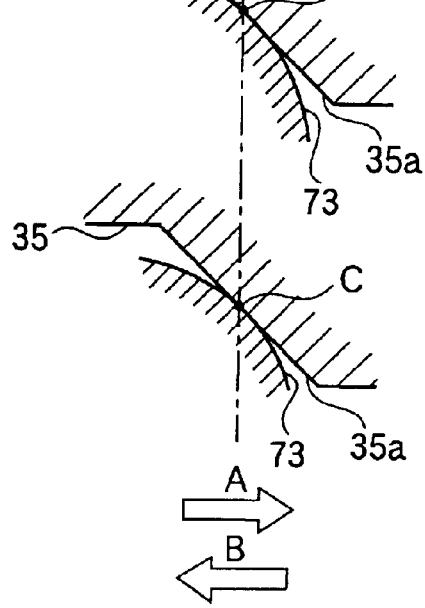

SHEET FEEDING MECHANISM AND IMAGE FORMING APPARATUS

BACKGROUND OF THE INVENTION

This invention relates to a sheet feeding mechanism having a tray for accommodating a stack of sheets used in an apparatus such as an image forming apparatus, and relates to an image forming apparatus having the tray.

FIG. 1 is a perspective view of a conventional sheet feeding mechanism used in an image forming apparatus. FIG. 2 is a schematic view of the conventional sheet feeding mechanism. As shown in FIG. 1, the sheet feeding mechanism includes a tray 101 in which a stack of sheets is accommodated. The tray 101 is inserted in a not-shown main body of the image forming apparatus. The tray 101 has a sheet feeding side 101a (i.e., the lower-right side of the tray 101 in FIG. 1) through which the sheets are fed out of the tray 101.

A pickup roller 111 and feeding rollers 112 and 113 are rotatably provided in the main body, and are located at the sheet feeding side 101a of the tray 101 inserted in the main body. The pickup roller 111 and the feeding rollers 112 and 113 are respectively rotated by motors (not shown) provided in the main body.

The tray 101 has a swingable base plate 102 supported by a support shaft 102a (FIG. 2). The tray 101 has adjustable guide plates 103, 104 and 105 guiding three sides of the stack of the sheets placed on the base plate 102. The guide plate 103 guides a side of the stack opposite to the sheet feeding side 101a. The guide plate 104 and 105 guide both sides of the stack in the direction perpendicular to the sheet feeding direction, i.e., the direction in which the sheets are fed out of the tray 1.

For swinging the base plate 102, a shaft 106 is rotatably provided in a case 108 attached to the sheet feeding side 101a of the tray 101. The shaft 106 has an end 106a projecting out of the case 108, and pins 106b are formed on the end 106a. The end 106a of the shaft 106 engages a coupling 110 of a motor 109 provided in the main body. As shown in FIG. 2, an L-shaped lifting member 107 is fixed to the shaft 106. When the shaft 106 rotates clockwise in FIG. 2, the lifting member 107 swings upward and abuts against the bottom of the base plate 102, so that the lifting member 107 lifts the base plate 102 toward the pickup roller 111. As a result, the uppermost sheet of the stack on the base plate 102 abuts against the pickup roller 111.

As shown in FIG. 1, for determining the position of the tray 101 in the main body, a holding member 115 is movably provided in the main body. The holding member 115 fits in a hole 114 formed on the case 108 of the tray 101, so that the tray 101 is held at a predetermined position in the main body. The holding member 115 is urged by a spring 116 in a direction in which the holding member 115 is inserted in the hole 114.

When a user inserts the tray 101 into the main body in the direction indicated by an arrow A (hereinafter, referred to as the direction A), the end 106a of the shaft 106 engages the coupling 110, and the holding member 115 fits in the hole 114, with the result that the tray 101 is fully inserted in the main body. Then, as shown in FIG. 2, the motor 109 rotates clockwise and the lifting member 107 swings upward to lift the base plate 102 toward the pickup roller 111. The height of the base plate 102 is detected by a detection unit 117. The rotation of the motor 109 is stopped in such a manner that the uppermost sheet of the stack on the base plate 102 abuts against the pickup roller 111. The positions of the lifting member 107 and the base plate 102 are respectively indicated by numerals 107U and 102U in FIG. 2. As the pickup roller 111 and the feeding rollers 112 and 113 rotate, the uppermost sheet is fed out of the tray 101.

As shown in FIG. 1, when the user pulls the tray 101 in a direction opposite to the direction A, the end 106a of the shaft 106 disengages from the coupling 110 of the motor 109. As the power of the motor 109 is not transmitted to the shaft 106, the lifting member 107 and the base plate 102 swing downward because of their weight, so that the uppermost sheet of the stack on the base plate 102 moves away from the pickup roller 111. The positions of the lifting member 107 and the base plate 102 are respectively indicated by numerals 107L and 102L in FIG. 2. In this state, the user pulls the tray 101 out of the main body.

However, in the above-described conventional sheet feeding mechanism, the lifting member 107 and the shaft 106 are provided in the tray 101, and therefore the weight of the tray 101 increases. Because of the weight of the tray 101, it is not easy for the user to insert the tray 101 into the main body and to pull the tray 101 out of the main body.

Moreover, the motor 109 must be located at a position where the end 106a of the shaft 106 engages the coupling 110 of the motor 109 when the tray 101 is inserted in the main body. As the position of the motor 109 is limited, it becomes difficult to make a compact image forming apparatus.

Further, when the user inserts the tray 101 into the main body, the tip 106a of the shaft 106 may collide with the coupling 110, so that the coupling 110 may be damaged.

SUMMARY OF THE INVENTION

An object of the present invention is to provide a sheet feeding mechanism and an image forming apparatus capable of solving the above described problems.

According to the invention, there is provided a sheet feeding mechanism used in an apparatus. The sheet feeding mechanism includes a tray that can be inserted in and pulled out of a main body of the apparatus. The tray accommodates a stack of sheets. The sheet feeding mechanism includes a lifting member provided in the main body so that the lifting member is able to move in the tray to lift the stack accommodated in the tray, and a driving mechanism provided in the main body. The driving mechanism drives the lifting member to lift the stack accommodated in the tray in a state where the tray is inserted in the main body, and moves the lifting member out of the tray when the tray is to be pulled out of the main body.

Since the lifting member and the driving mechanism are provided in the main body of the apparatus, the weight of the tray can be reduced. Therefore, it becomes easy for the user to insert the tray into the main body and to pull the tray out of the main body.

Moreover, when the tray is to be pulled out of the main body, the lifting member moves out of the main body, and therefore the collision between the lifting member and the tray can be prevented.

Further, since the driving mechanism are provided in the main body, it is possible to prevent the collision between the components of the driving mechanism when the tray is inserted in the main body.

Additionally, the position of the driving mechanism is not limited as in the conventional sheet feeding mechanism, and therefore the driving mechanism can be designed in various ways. Thus, it becomes possible to make the compact image forming apparatus.

BRIEF DESCRIPTION OF THE DRAWINGS

In the attached drawings:

FIG. 23 is a horizontal cross section of the switching member when the switching member deeply fits in a recess according to Embodiment 4; and FIGS. 24A and 24B are schematic views illustrating the operation of the switching member according to Embodiment 4.

DETAILED DESCRIPTION OF THE INVENTION

Embodiments of the present invention will be described with reference to the attached drawings.

Embodiment 1.

Figure 3:
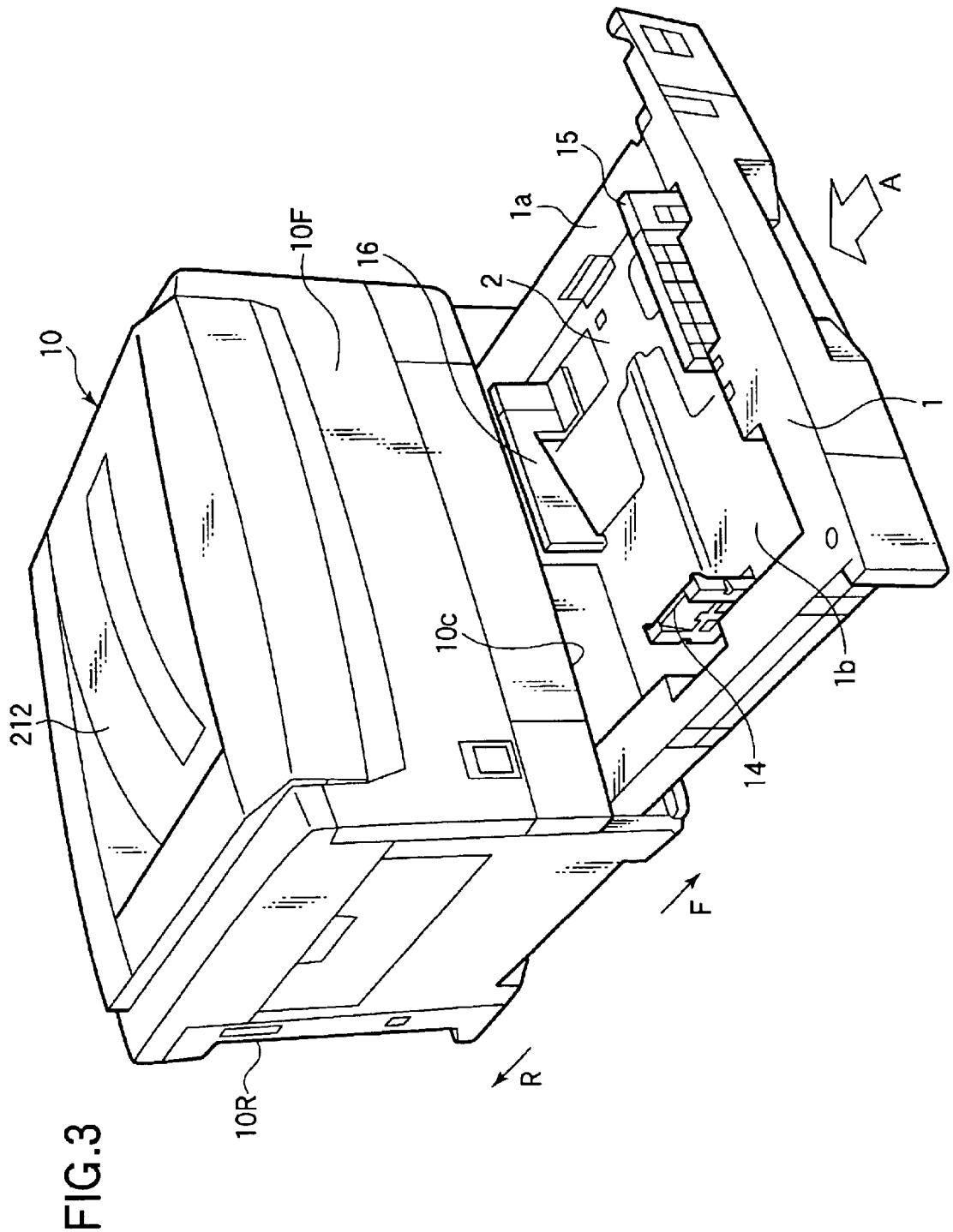
FIG. 3 is a perspective view of an image forming apparatus having a sheet feeding mechanism according to Embodiment 1.
Figure 4:
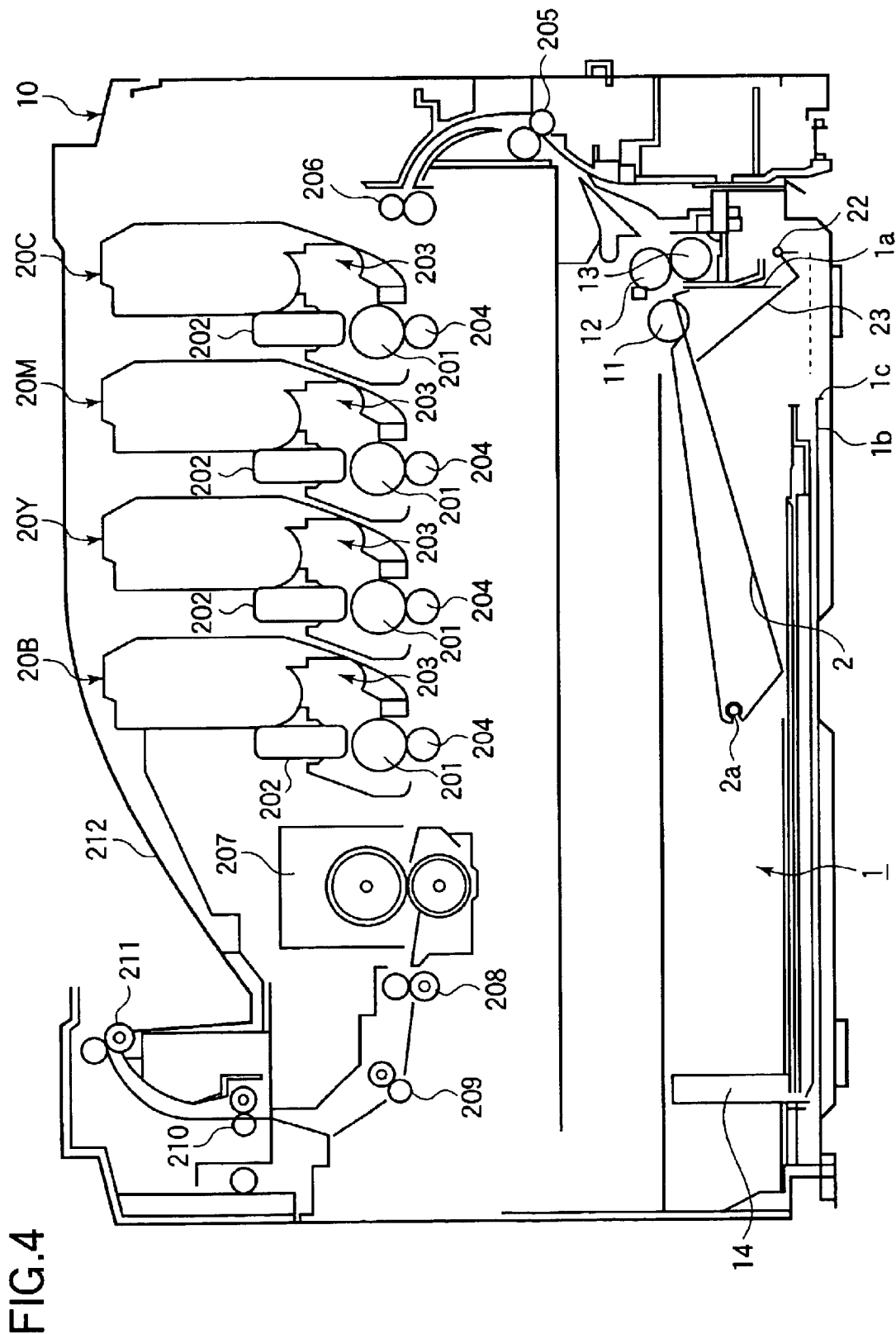
FIG. 4 is a sectional view of the image forming apparatus shown in FIG. 3.

FIG. 3 is a perspective view of an image forming apparatus in the form of an electro-photographic printer having a sheet feeding mechanism according to Embodiment 1. FIG. 4 is a sectional view of the image forming apparatus shown in FIG. 3. The image forming apparatus includes a main body 10 and a tray 1 accommodating a stack of sheets (not shown). The tray 1 is inserted in the main body 10 in a direction indicated by an arrow A (i.e., the direction A) and is pulled out of the main body 10 in the direction opposite to the direction A.

The main body 10 has a front wall 10F and a rear wall 10R opposed to each other. The tray 1 is inserted in the main body 10 through an opening 10C formed on the front wall 10F. In the description below, the term "front" is used to mean the front wall 10F side of the main body 10, as indicated by an arrow F. The term "rear" is used to mean the rear wall 10R side of the main body 10, as indicated by an arrow R. In the description of the tray 1, the terms "front" and "rear" are used as described above, on the condition that the tray 1 is fully inserted in the main body 10. The front-rear direction is parallel to the direction A.

Figure 1:
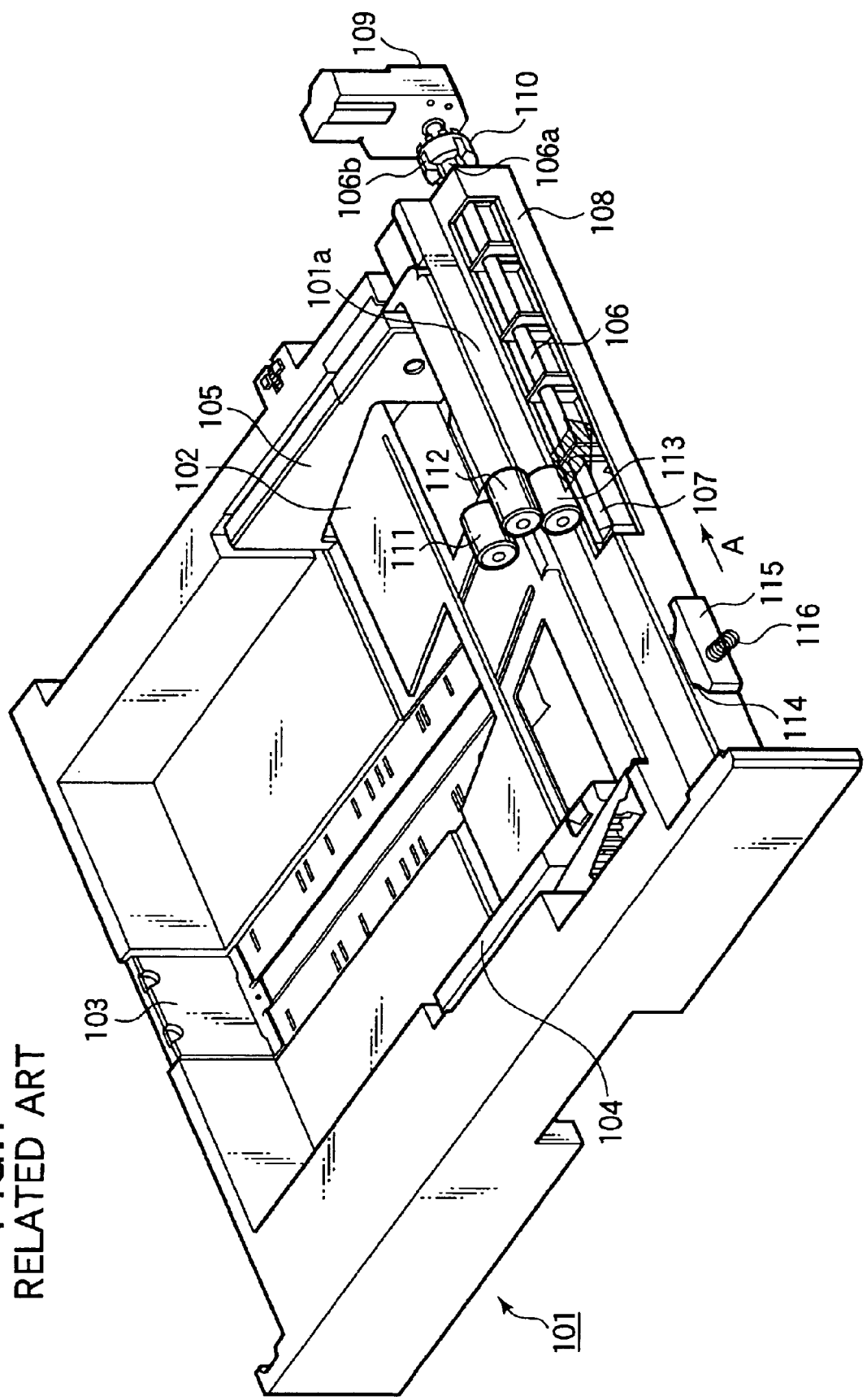
FIG. 1 is a perspective view of a conventional sheet feeding mechanism.
Figure 2:
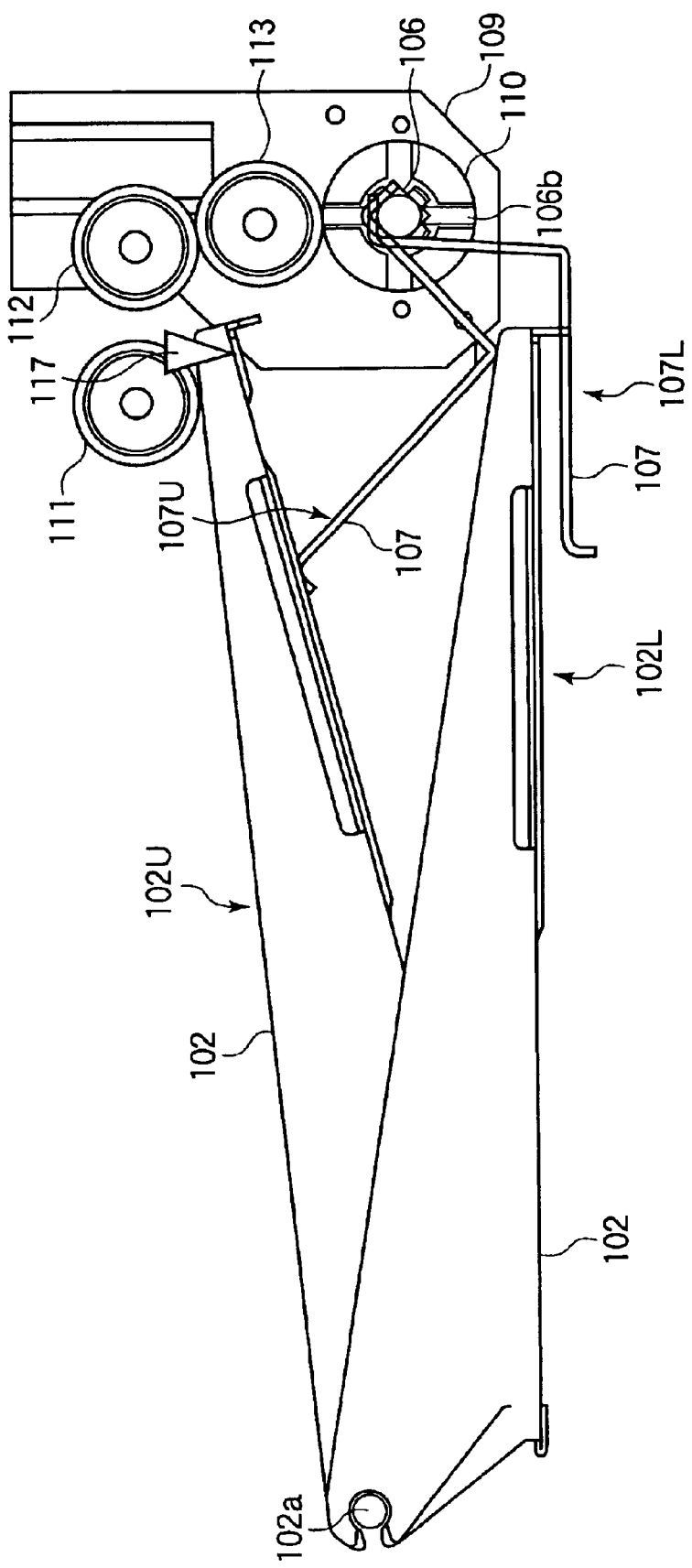
FIG. 2 is a schematic view of the conventional sheet feeding mechanism shown in FIG. 1.

The tray 1 has a base plate 2 on which the stack of the sheets is placed. The base plate 2 is swingably supported by a support shaft 2a (FIG. 4) provided in the tray 1. The tray 1 has a sheet feeding side 1a (i.e., the upper-right side in FIG. 1) through which the sheets are fed out of the tray 1. The sheet feeding side 1a of the tray 1 extends in the front-rear direction.

The tray 1 is inserted in the lower part of the main body 10. A pickup roller 11 is provided in the main body 10 and is substantially located directly above the sheet feeding side 1a of the tray 1. Another pair of feeding rollers 12 and 13 are provided in the main body 10 and are adjacent to the pickup roller 11. The pickup roller 11 and the feeding rollers 12 and 13 are respectively fixed to output shafts of motors (not shown) provided in the main body 10. The pickup roller 11 picks up the uppermost sheet of the stack placed on the base plate 2, and the feeding rollers 12 and 13 feed the uppermost sheet out of the tray 1. Another pair of feeding rollers 205 are provided for feeding the sheet from the feeding rollers 12 and 13 to the upper part of the main body 10. A third pair of resist rollers 206 are provided in the upper part of the main body 10, for preventing the skew of the sheet.

In the upper part of the main body 10, the sheet is fed from the right to the left in FIG. 4. Image forming units 20C, 20M, 20Y and 20B are provided along the sheet feeding path. The image forming units 20C, 20M, 20Y and 20B respectively transfer toner image of cyan, magenta, yellow and black on the sheet. Each of the image forming unit 20C, 20M, 20Y and 20B includes a photoconductive drum (i.e., an image holding body) 201, an exposure unit 202, a developing unit 203 and a transfer charger 204. The exposure unit 202 exposes the surface of the drum 201 to form electrostatic latent image on the drum 201. The developing unit 203 develops the latent image to form toner image on the drum 201. The transfer charger 204 transfers the toner image on the drum 201 to the sheet. The transfer charger 204 in the form of a roller rotates to feed the sheet along the sheet feeding path.

A fixing unit 207 is provided at the downstream side (i.e., the left side in FIG. 4) of the image forming units 20C, 20M, 20Y and 20B. The fixing unit 207 fixes the toner image to the sheet. Eject rollers 208, 209, 210 and 211 are provided for ejecting the sheet from the fixing unit 207 out of the main body 10. Ejected sheets are stacked on a stacker portion 212 formed on the top of the main body 10.

Figure 5:
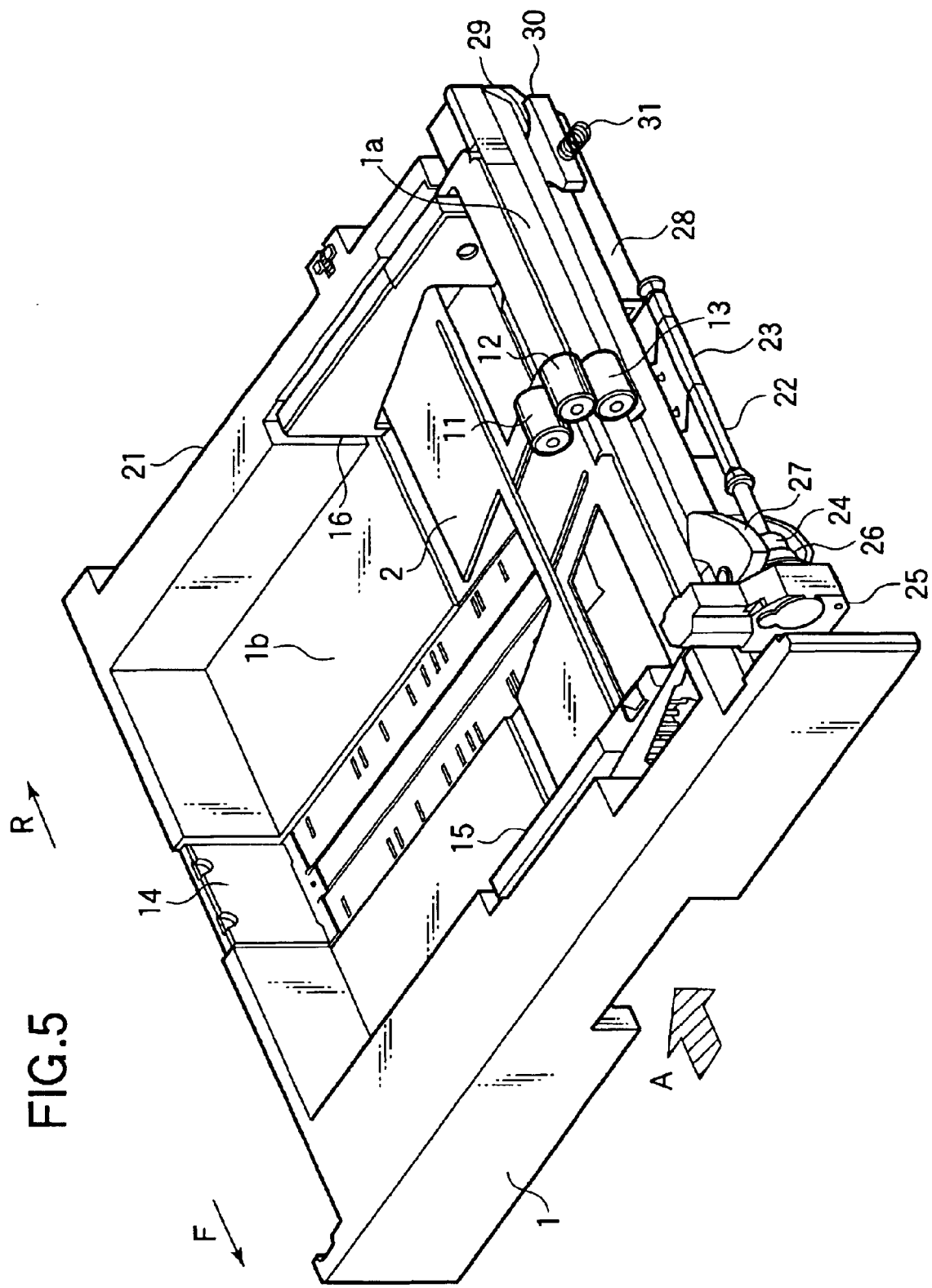
FIG. 5 is a perspective view of the sheet feeding mechanism according to Embodiment 1.

FIG. 5 is a perspective view of the sheet feeding mechanism according to Embodiment 1. The tray 1 includes adjustable guide plates 14, 15 and 16 guiding three sides of the stack on the base plate 2. The guide plate 14 guides a side of the stack opposite to the sheet feeding side 1a. The guide plates 15 and 16 guide both sides of the stack in the direction perpendicular to the sheet feeding direction.

A shaft 22 is provided in the main body 10 and is adjacent to the sheet feeding side 1a of the tray 1 inserted in the main body 10. The shaft 22 extends in the front-rear direction. A lifting member 23 is fixed to the shaft 22.

Figure 6:
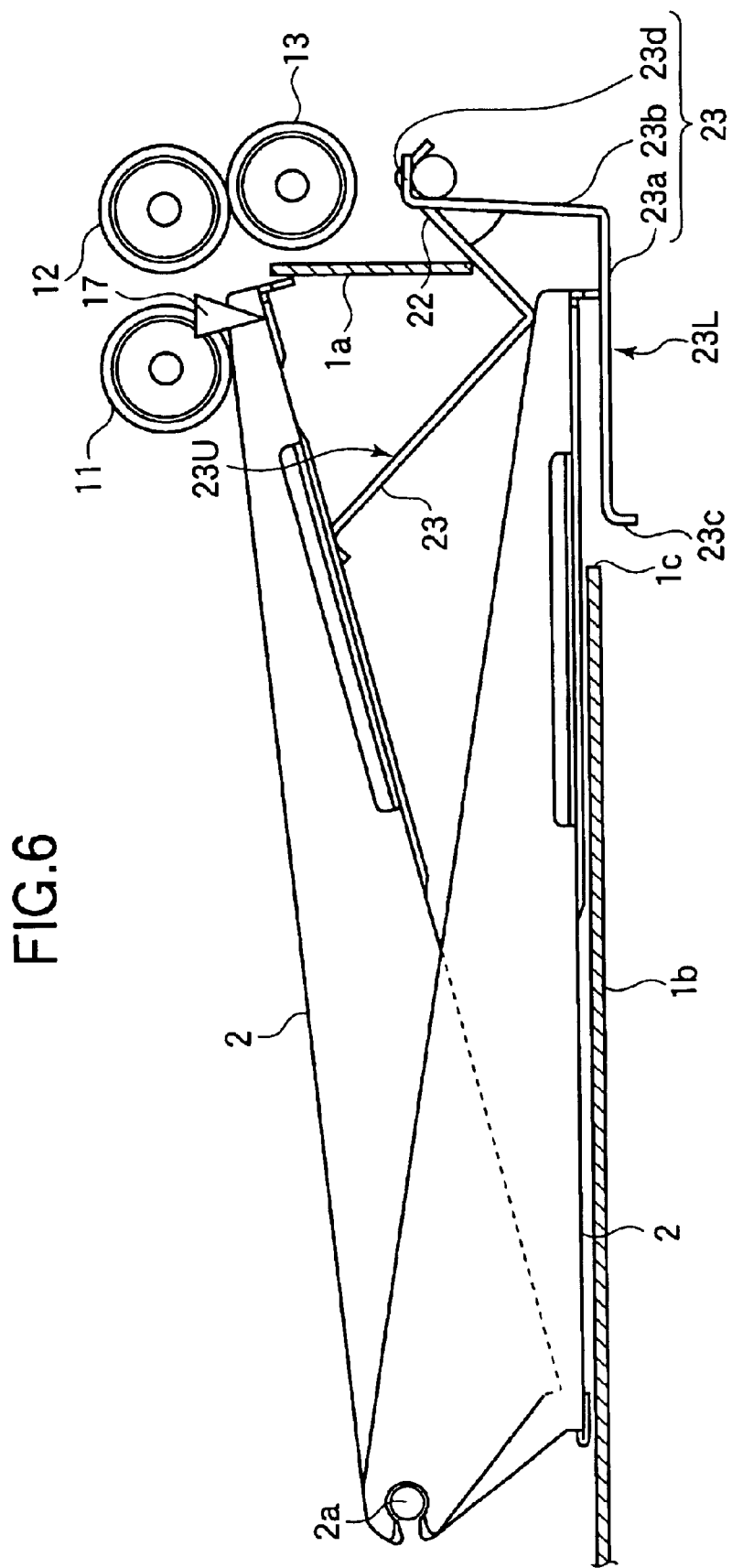
FIG. 6 is a schematic view of the sheet feeding mechanism according to Embodiment 1.

FIG. 6 is a schematic view of the sheet feeding mechanism according to Embodiment 1. The lifting member 23 is a plate member bent substantially in L-shape, and includes two plate portions 23a and 23b substantially perpendicular to each other. An end 23d of the plate portion 23b is fixed to the shaft 22.

When no driving force is applied to the shaft 22, the lifting member 23 is at its lower position indicated by a numeral 23L. In this lower position, the plate member 23 is out of the tray 1. To be more specific, the plate member 23a is below a bottom 1b of the tray 1 and the plate member 23b is at the right side of the sheet feeding side 1a in FIG. 6.

When the shaft 22 rotates clockwise in FIG. 6, the lifting member 23 fixed to the shaft 7 swings upward as indicated by a numeral 23U in FIG. 6. When the lifting member 23 swings upward, the plate portions 23a and a part of the plate portion 23b enter into the interior of the tray 1 through an opening 1c formed in the bottom 1b and the sheet feeding side 1a of the tray 1. An end 23c of the plate portion 23a abuts against the bottom of the base plate 2 and urges the base plate 2 upward.

Figure 7:
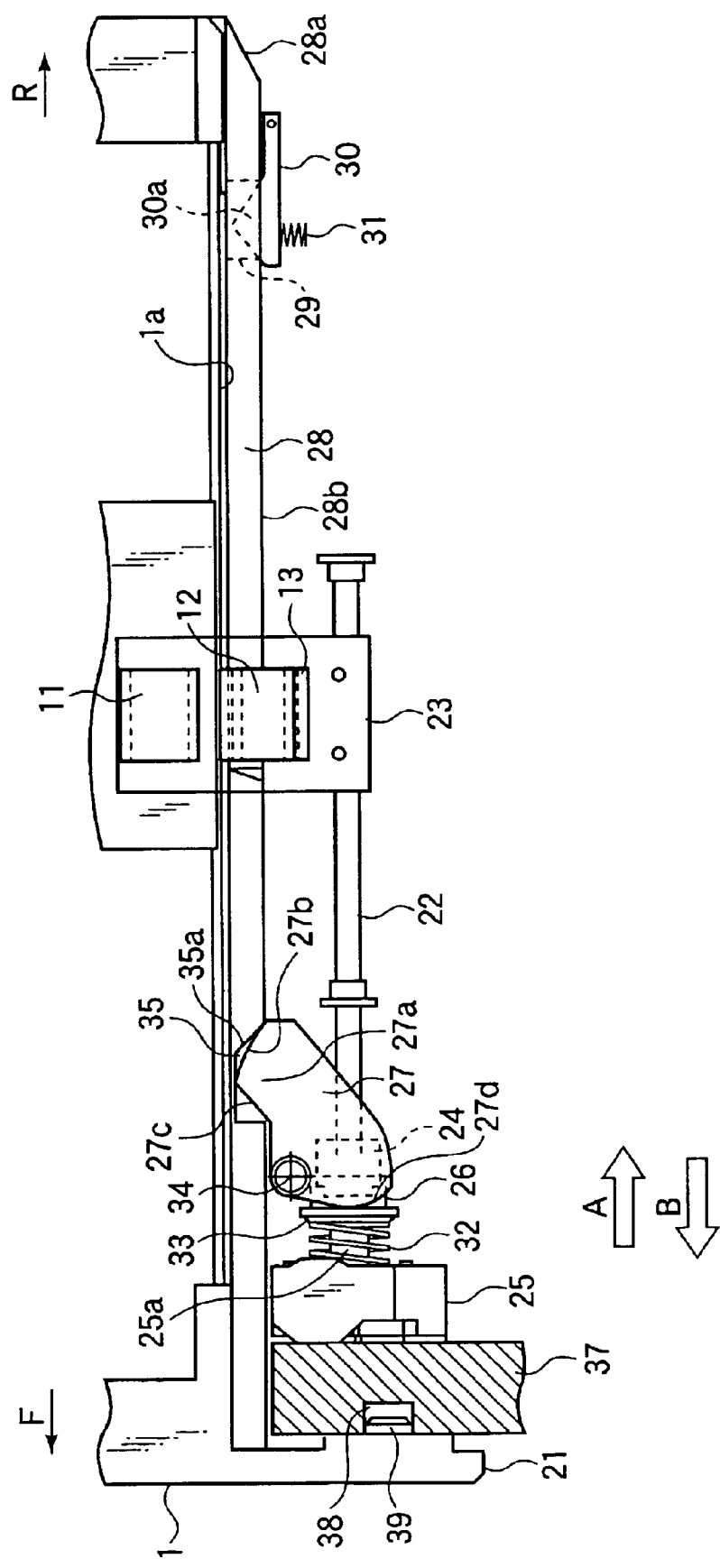
FIG. 7 is a plan view of the main part of the sheet feeding mechanism when the tray is fully inserted in the main body according to Embodiment 1.

FIG. 7 is a plan view of the main part of the sheet feeding mechanism of Embodiment 1. A guide bar 28 is attached to the sheet feeding side 1a of the tray 1. The guide bar 28 extends in the front-rear direction. The guide bar 28 has a vertical flat surface 28b parallel to the longitudinal direction of the guide bar 28. Further, the guide bar 28 has a vertical end surface 28a formed at the rear end thereof. The end surface 28a is inclined with respect to the flat surface 28b of the guide bar 28.

For determining the position of the tray 1 in the main body 10 in the front-rear direction, a lever 30 is provided in the main body 10 and is adjacent to the guide bar 28. The lever 30 has a protrusion 30a that fits in a hole 29 formed in the guide bar 28. The lever 30 is urged by a coil spring 31 in the direction in which the protrusion 30a moves in the hole 29. In addition, for determining the position of the tray 1 in the main body 10 in the horizontal direction perpendicular to the front-rear direction, a boss 39 is formed on the tray 1. The boss 39 fits in a positioning hole 38 formed on a support member 37 provided in the main body 10.

A recess 35 is formed on the side of the guide bar 28 that faces the shaft 22. A vertical end surface 35a is formed at the rear end (i.e., the right end in FIG. 7) of the recess 35. The end surface 35a is inclined with respect to the flat surface 28b of the guide bar 28. A switching member 27 is provided in the main body 10 so that the switching member 27 is adjacent to the recess 35 when the tray 1 is inserted in the main body 10. The switching member 27 is rotatably supported by a vertical shaft 34 provided in the main body 10. The switching member 27 has a protrusion 27a protruding toward the tray 1. The protrusion 27a fits in the recess 35 of the guide bar 28 when the tray 1 is fully inserted in the main body 10. The protrusion 27a has two contact surfaces 27b and 27c. The contact surfaces 27b and 27c are adjacent to each other, with a ridge formed therebetween. The contact surface 27c contacts the end surface 28a of the guide bar 28, when the tray 1 is inserted in the main body 10. The contact surface 27b contacts the end surface 35a of the recess 35, when the protrusion 27a fits in the recess 35.

A motor 25 for rotating the shaft 22 is supported by the support member 37 formed in the main body 10. The motor 25 is located at a front side with respect to the shaft 22. A first coupling 26 is slidably mounted to an output shaft 25a (FIG. 8) of the motor 25. A second coupling 24 is fixed to the front end (i.e., the left end in FIG. 7) of the shaft 22 so that the first coupling 26 and the second coupling 24 are able to engage each other.

Figure 8:
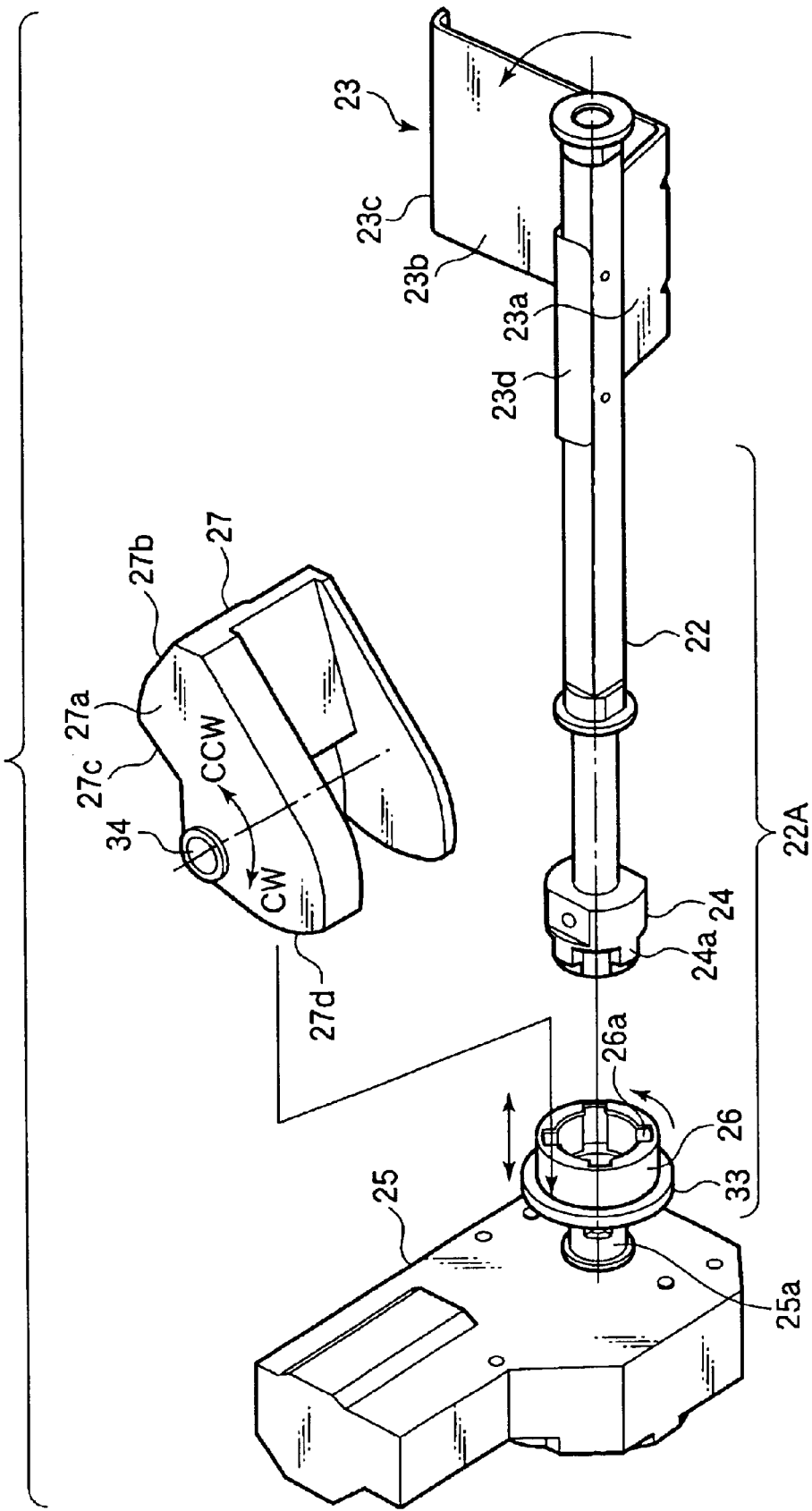
FIG. 8 is an exploded perspective view of a transmission of the sheet feeding mechanism according to Embodiment 1.

FIG. 8 is an exploded perspective view of a mechanism for transmitting the power of the motor 25 to the lifting member 23. The switching member 27 has a further contact surface 27d formed on the side that faces the motor 25. The first coupling 26 has a flange 33 that contacts the contact surface 27d of the switching member 27. A coil spring 32 (FIG. 7) is provided between the motor 25 and the flange 33 of the first coupling 26. The coil spring 32 urges the first coupling 26 in the direction away from the motor 25. The first coupling 26, the second coupling 24 and the shaft 22 constitute a transmission 22A for transmitting the power of the motor 25 to the lifting member 23. When the switching member 27 rotates clockwise in FIG. 8, the switching member 27 urges the first coupling 26 in the direction toward the motor 25, so that the first coupling 26 moves away from the second coupling 24 and disengages from the second coupling 24. In this state, the power of the motor 25 is not transmitted to the lifting member 23, i.e., the transmission 22A is disconnected. In contrast, when the switching member 27 rotates counterclockwise in FIG. 8, the switching member 27 does not urge the first coupling 26, so that the first coupling 26 moves toward the second coupling 24 by the force of the coil spring 32 and engages the second coupling 24. In this state, the power of the motor 25 is transmitted to the lifting member 23, i.e., the transmission 22A is connected.

Figure 9:
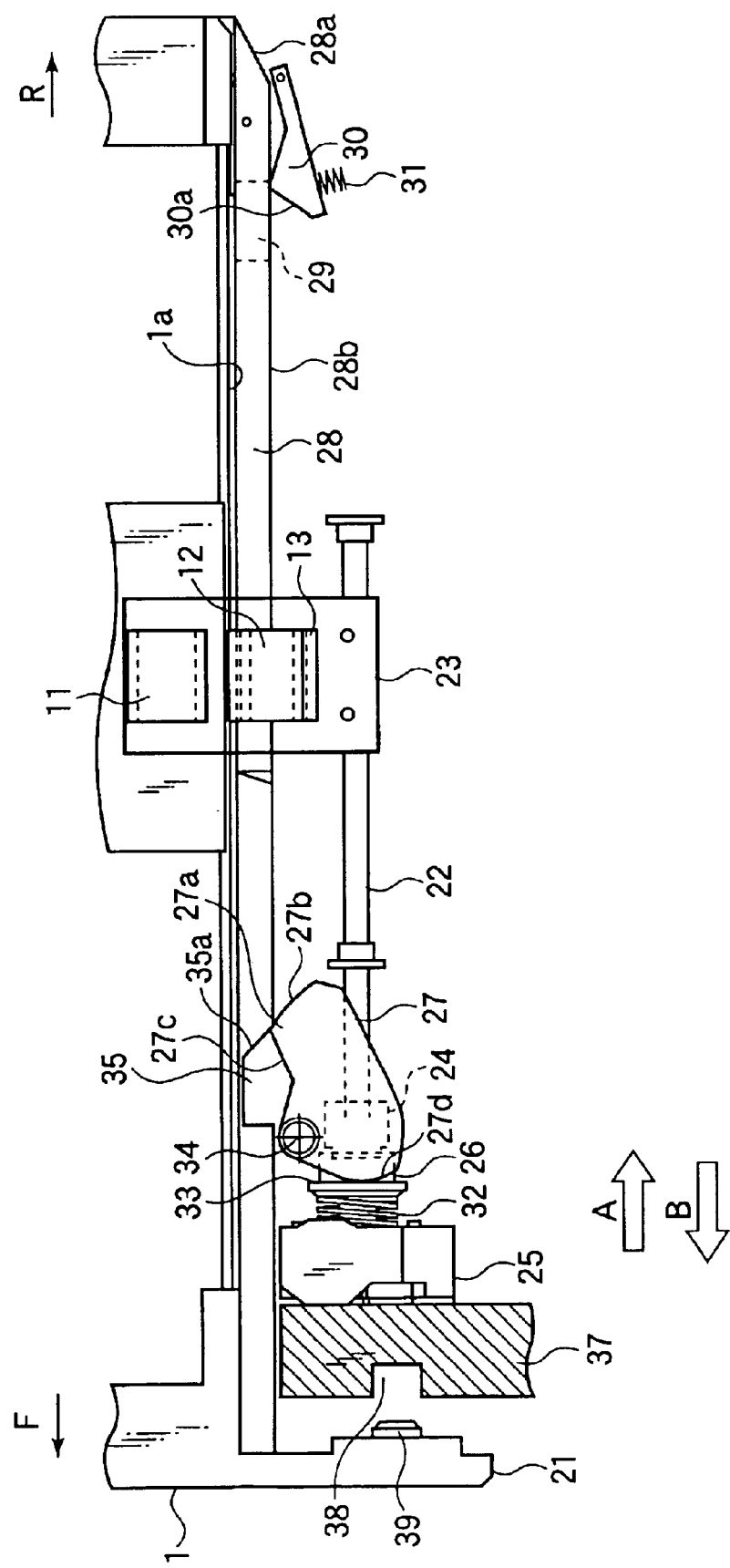
FIG. 9 is a plan view of the main part of the sheet feeding mechanism when the tray is being inserted in the main body according to Embodiment 1.

The operation for inserting the tray 1 into the main body 10 will be described. FIG. 9 is a plan view of the main part of the sheet feeding mechanism when the tray 1 is being inserted in the main body 10. When a user inserts the tray 1 into the main body 10 in the direction A, the end surface 28a of the guide bar 28 abuts against the contact surface 27c of the switching member 27, so that the switching member 27 rotates in the direction away from the tray 1 (i.e., clockwise in FIG. 9), and urges the first coupling 26 in the direction away from the second coupling 24 overcoming the force of the coil spring 32. As the first coupling 26 disengages from the second coupling 24, the power of the motor 25 is not transmitted to the shaft 22, so that the lifting plate 23 remains at the lower position indicated by the numeral 23L in FIG. 6. When the user further inserts the tray 1 into the main body 10, the flat surface 28b of the guide bar 28 abuts against the ridge of the protrusion 27a of the switching member 27 so that the switching member 27 keep urging the first coupling 26 in the direction away from the second coupling 24.

When the user further inserts the tray 1 into the main body 10, the protrusion 27a of the switching member 27 fits in the recess 35 of the guide bar 28 as shown in FIG. 7. The user perceives a tactile response when the protrusion 27a of the switching member 27 fits in the recess 35, and is able to recognize that the tray 1 is fully inserted in the main body 10. Further, when the switching member 27 fits in the recess 35, the protrusion 30a of the lever 30 fits in the hole 29, so that the position of the tray 1 in the main body 10 is determined in the front-rear direction. In addition, the boss 39 formed on the tray 1 fits in the positioning hole 38 of the main body 10, so that the position of the tray 1 in the main body 10 is determined in the horizontal direction perpendicular to the front-rear direction.

As the protrusion 27a of the switching member 27 fits in the recess 35, the first coupling 26 moves toward the second coupling 24 by the force of the coil spring 32, and engages the second coupling 24. As a result, the power of the motor 25 is transmitted to the shaft 22.

There is a possibility that the convexes 24a (FIG. 8) of the second coupling 24 initially do not fit in the concaves 26a (FIG. 8) of the first coupling 26. In such a case, the convexes 24a of the second coupling 24 fit in the concaves 26a of the first coupling 26 when the first coupling 26 starts rotating together with the motor 25 while the first coupling 26 is urged in the direction toward the second coupling 24 by the coil spring 32.

After the first coupling 26 engages the second coupling 24, when the motor 25 rotates, the shaft 22 also rotates so that the lifting member 23 swings upward and urges the base plate 2 upward. The height of the base plate 2 is detected by a detection unit 17 (FIG. 6). The rotation of the motor 25 is stopped in such a manner that the uppermost sheet of the stack on the base plate 2 abuts against the pickup roller 11. As the pickup roller 11 rotates, the uppermost sheet is picked up by the pickup roller 11 and fed to the feeding rollers 12 and 13. The feeding rollers 12 and 13 feed the uppermost sheet to the image forming units 20C, 20M, 20Y and 20B (FIG. 4) of the main body 10 as described above.

The operation for pulling the tray 1 out of the main body 10 will be described. When the user pulls the tray 1 in the direction B opposite to the direction A, the end surface 35a of the recess 35 slides along the contact surface 27b or the ridge of the protrusion 27a of the switching member 27, so that the switching member 27 rotates in the direction in which the protrusion 27a moves out of the recess 35.

When the protrusion 27a of the switching member 27 moves out of the recess 35, the switching member 27 urges the first coupling 26 in the direction away from the second coupling 24. The first coupling 26 disengages from the second coupling 24, so that the power of the motor 25 is not transmitted to the shaft 22. As a result, the lifting member 23 swings downward to the lower position 23L (FIG. 6) because of the weight of the lifting member 23 and the base plate 2, and therefore the base plate 2 swings downward so that the uppermost sheet of the stack on the base plate 2 separates from the pickup roller 11. In the lower position 23L, the lifting member 23 does not interfere with the tray 1 being pulled out of the main body 10. Thus, user is able to pull the tray 1 out of the main body 10.

Although the motor 25 is located at the front side of the shaft 22 in the above description, the motor 25 can be located at the rear side with respect to the shaft 22.

According to Embodiment 1, the lifting member 23 and the shaft 22 are provided in the main body 10, and therefore the weight of the tray 1 can be reduced. As a result, it becomes easy for the user to insert the tray 1 into the main body 10 and to pull the tray 1 out of the main body 10.

Moreover, the motor 25 can be located at either side of the shaft 22, and therefore the limitation of the position of the motor 25 is reduced. Thus, the degree of freedom in the design of the main body 10 is increased.

Further, the lifting member 23 moves out of the tray 1 when the tray 1 is to be pulled out of the main body 10, so that the lifting member 23 does not interfere with the tray 1 being pulled out from the main body 10.

Furthermore, the first coupling 26 disengages from the second coupling 24 when the tray 1 is being pulled out of the main body 1, and therefore it becomes possible to accomplish the arrangement for moving the lifting member 23 out of the tray 1.

In addition, the lifting member 23, the shaft 22 and the motor 25 are provided in the main body 10, and therefore it is possible to prevent the collision between the components which may occur in the conventional sheet feeding mechanism.

Embodiment 2.

Figure 10:
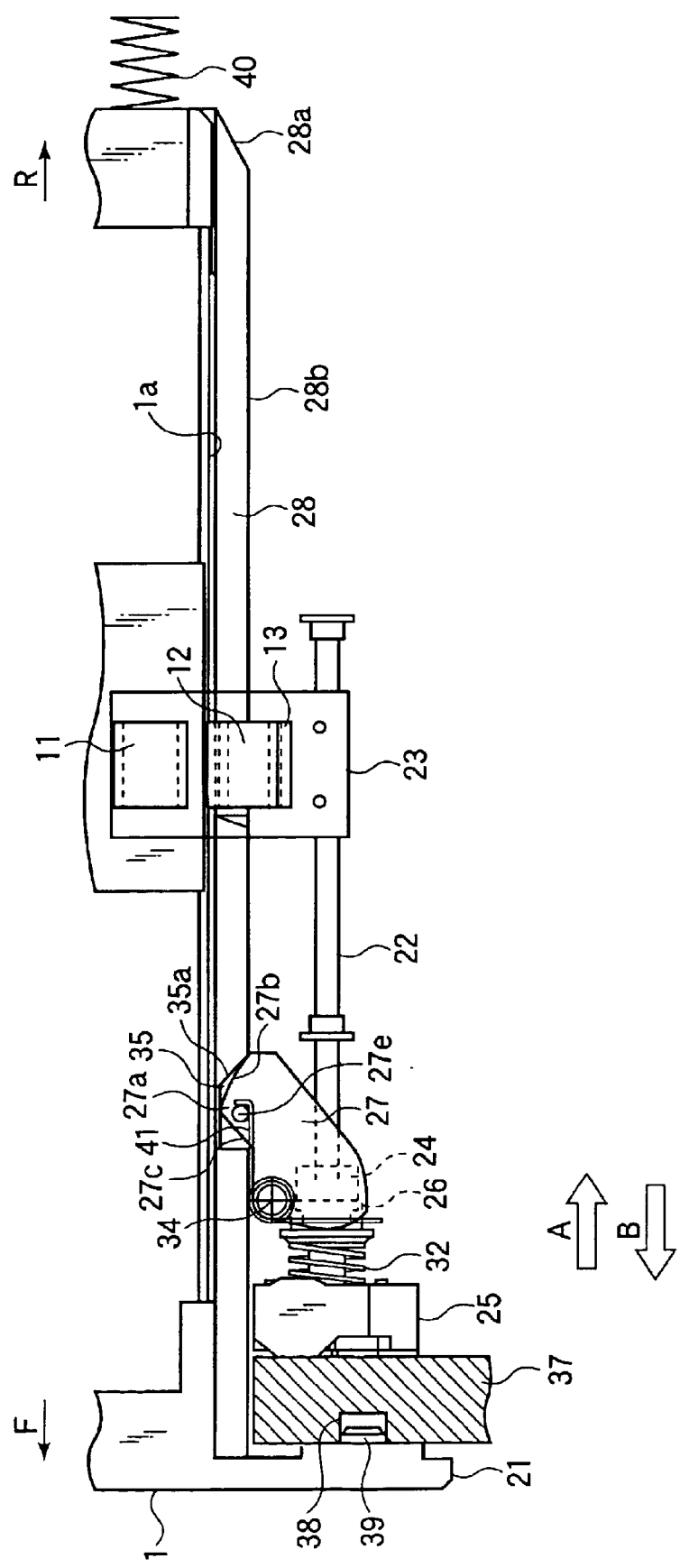
FIG. 10 is plan view of the main part of the sheet feeding mechanism according to Embodiment 2.

FIG. 10 is a plan view of the main part of sheet feeding mechanism according to Embodiment 2. In Embodiment 2, a first spring 41 in the form of a torsion spring is provided for urging the switching member 27 in the direction in which the protrusion 27a of the switching member 27 moves in the tray 1. Further, a second spring 40 in the form of a coil spring is provided for urging the tray 1 in the direction in which the tray 1 is pulled out of the main body 10.

Figure 11:
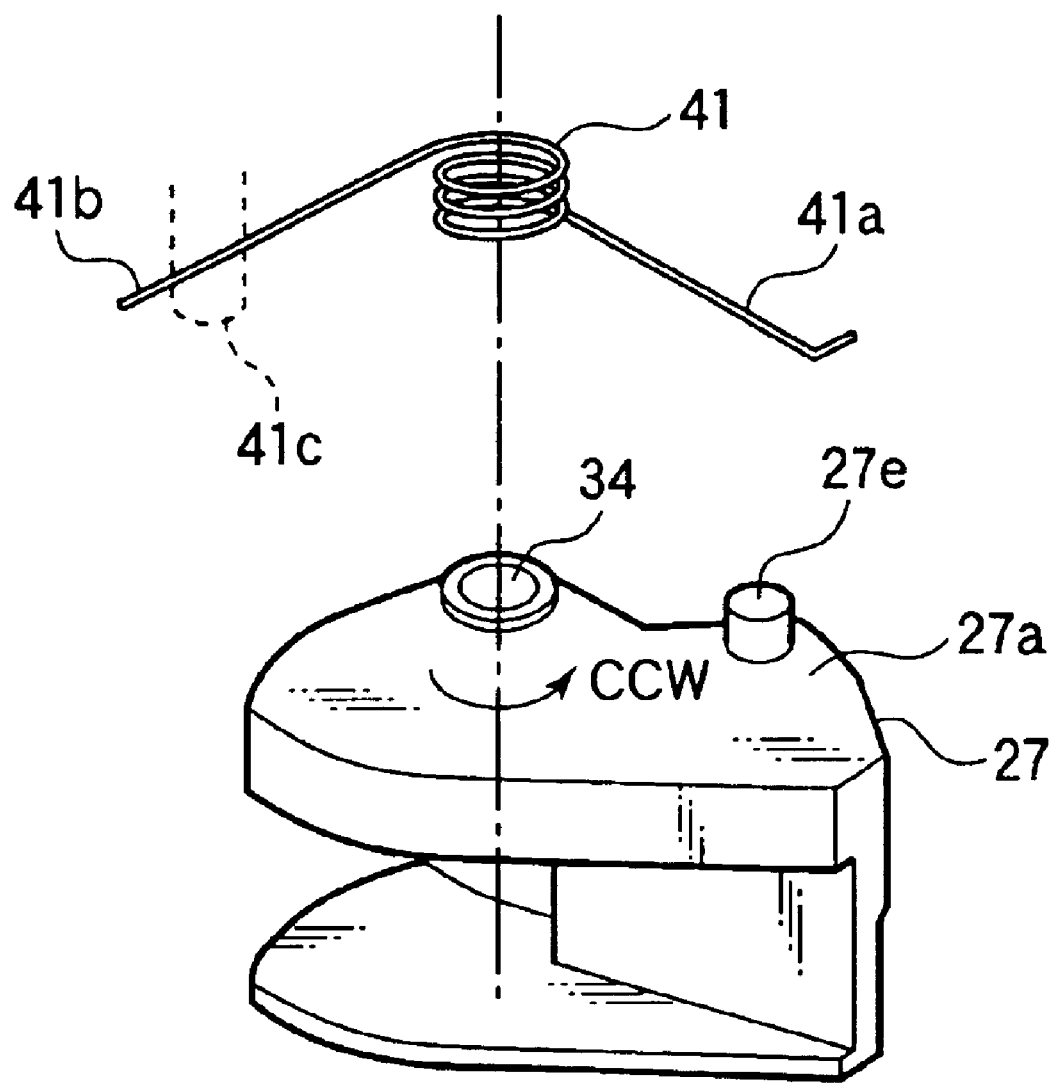
FIG. 11 is a perspective view of a switching member and a first spring according to Embodiment 2.

FIG. 11 is a perspective view of the driving mechanism 27 and the first spring 41. The first spring 41 is wound around the vertical shaft 34 of the switching member 27 in such a manner that the first spring 41 resiliently urges the switching member 27 in the direction in which the protrusion 27a of the switching member moves in the recess 35 of the tray 1. To be more specific, one end 41a of the first spring 41 abuts against a boss 27e formed on the switching member 27. The other end 41b of the first spring 41 abuts against a member 41c provided in the main body 10. The first spring 41 urges the switching member 27 so that the switching member 27 rotates counterclockwise in FIG. 11.

As shown in FIG. 10, the second spring 40 is provided in the main body 10 and is located at the rear side of the tray 1 in such a manner that the second spring 40 resiliently urges the tray 1 in the direction B, i.e., the direction in which the tray 1 is pulled out of the main body 10.

In this Embodiment 2, the lever 30 (FIG. 7) and the hole 29 (FIG. 7) as in the Embodiment 1 are not provided. Other components of the sheet feeding mechanism of Embodiment 2 are the same as those of Embodiment 1.

Figure 12:
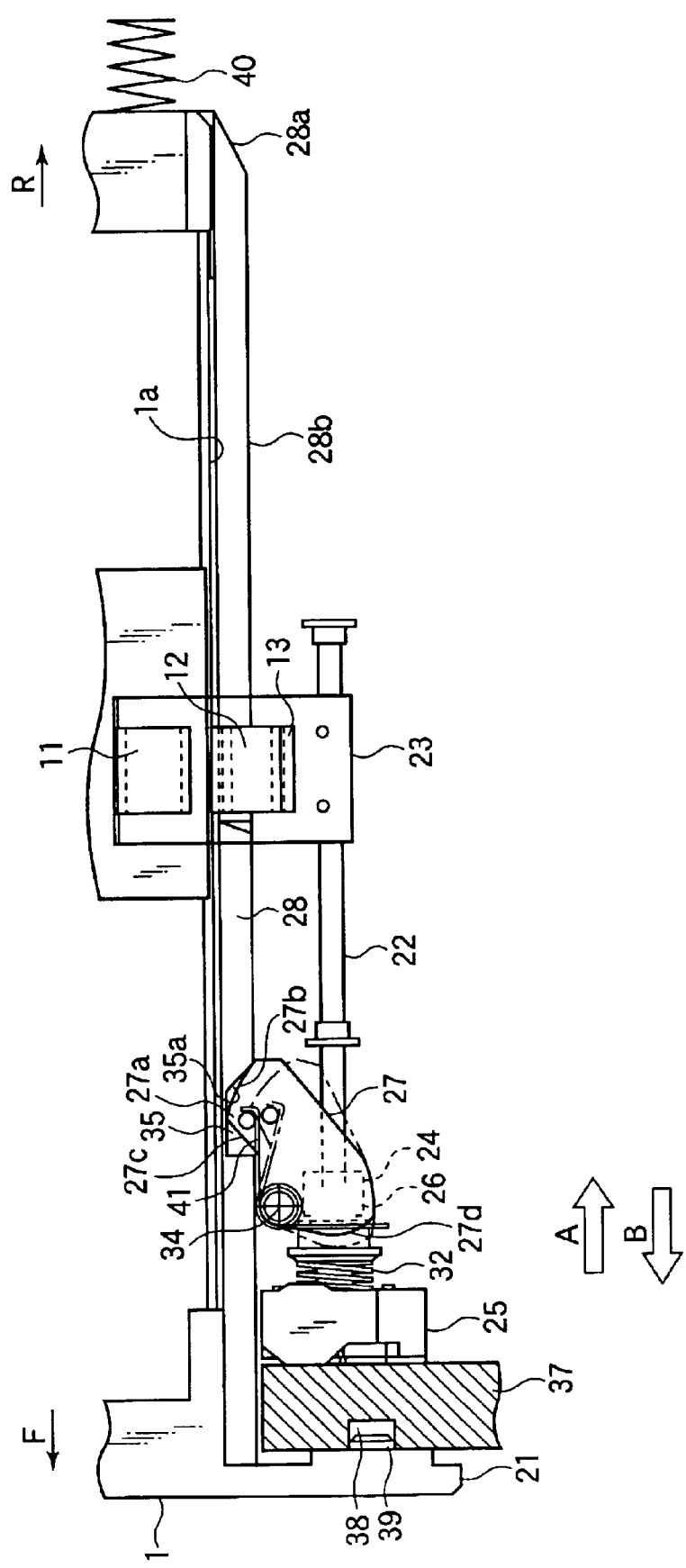
FIG. 12 is a plan view illustrating the operation of the sheet feeding mechanism according to Embodiment 2.

The operation for inserting the tray 1 into the main body 10 will be described. FIG. 12 is a plan view of the main part of the sheet feeding mechanism when the tray 1 is fully inserted in the main body 10. When the user inserts the tray 1 into the main body 10, the end surface 28a of the guide bar 28 abuts against the contact surface 27c of the protrusion 27a of the switching member 27, so that the switching member 27 rotates in the direction away from the tray 1 overcoming the force of the first spring 41 and the coil spring 32. The switching member 27 urges the first coupling 26 in the direction away form the second coupling 24, so that power of the motor 25 is not transmitted to the shaft 22, and therefore the lifting member 23 remains at the lower position 23L (FIG. 6). When the user further inserts the tray 1 into the main body 10, the flat surface 28b of the guide bar 28 abuts against the ridge of the protrusion 27a of the switching member 27, so that the switching member 27 keep urging the first coupling 26 in the direction away from the second coupling 24.

When the user further inserts the tray 1 into the main body 10, the protrusion 27a of the switching member 27 fits in the recess 35 because of the force of the coil spring 32 and the first spring 41. The user perceives a tactile response when the switching member 27 fits in the recess 35, and therefore the user is able to recognize that the tray 1 is fully inserted in the main body 10. When the user releases his hands from the tray 1, the tray 1 is pushed back by the second spring 40 until the end surface 35a of the recess 35 abuts against the contact surface 27b of the switching member 27. Although the tray 1 is forced by the second spring 40 in the direction B, the first spring 41 and the coil spring 32 prevent the protrusion 27a from moving out of the recess 35. Because of the contact between the end surface 35a of the recess 35 and the contact surface 27b of the switching member 27, the position of the tray 1 in the main body 10 is determined in the front-rear direction. Further, the tray 1 is prevented from being dropped out of the main body 10 because of the vibration or the like. Since the switching member 27 is urged by the first spring 41, it is ensured that the protrusion 27a of the switching member 27 fits in the recess 35.

As the protrusion 27a of the switching member 27 fits in the recess 35, the first coupling 26 moves toward the second coupling 24 and engages the second coupling 24. Thus, the power of the motor 25 is transmitted to the shaft 22. When the motor 25 rotates, the lifting member 23 urges the base plate 22 upward as described in Embodiment 1.

As was also described in Embodiment 1, there is a possibility that the convexes of the second coupling 24 initially do not fit in the concaves of the first coupling 26. In such a case, the force of the coil spring 32 may not be applied to the switching member 27, and the protrusion 27a of the switching member 27 may not fit in the recess 35 as shown in dashed line in FIG. 12. However, in Embodiment 2, the switching member 27 is urged by the first spring 41 in the direction toward the tray 1, and therefore it is ensured that the protrusion 27a of the switching member 27 fits in the recess 35. Further, when the first coupling 26 starts rotating together with the motor 25 while the first coupling 26 is urged in the direction toward the second coupling 24 by the coil spring 32, the convexes of the second coupling 24 fit in the concaves of the first coupling 26.

In the above operation, when the user inserts the tray 1 into the main body 10, the user must apply a sufficient force to the tray 1 for overcoming the force of the first spring 41, the second spring 40 and the coil spring 32, so that the user perceives the relatively large counterforce. Therefore, when the tray 1 is fully inserted in the main body 10, the user perceives that the counterforce decreases. As a result, the user is able to clearly recognize that the tray 1 is fully inserted in the main body 10.

The operation for pulling the tray 1 out of the main body 10 will be described. When the user pulls the tray 1 in the direction B opposite to the direction A, the protrusion 27a of the switching member 27 moves out of the recess 35 and contacts the flat surface 28b of the guide bar 28, overcoming the force of the first spring 41 and the coil spring 32.

As the protrusion 27a of the switching member 27 moves out of the recess 35, the switching member 27 urges the first coupling 26 away from the second coupling 24. As the first coupling 26 disengages from the second coupling 24, the power of the motor 25 is not transmitted to the shaft 22, so that the lifting member 23 swings downward to the lower position 23L (FIG. 6) because of the weight of the lifting member 23 and the base plate 2. As a result, the base plate 2 swings downward, so that the uppermost sheet of the stack on the base plate 2 separates from the pickup roller 11. The lifting member 23 does not interfere with the tray 1 being pulled out, so that the user is able to pull the tray 1 out of the main body 10.

In the above operation, when the user pulls the tray 1 out of the main body 10, the user must apply a sufficient force to the tray 1 for overcoming the force of the first spring 41 and the coil spring 32, so that it is possible to prevent the tray 1 from being unintentionally pulled out of the main body 10. In addition, it is possible to prevent the tray 1 from being dropped out of the main body 10 because of the vibration or the like.

As described above, according to Embodiment 2, the first spring 41 urges the switching member 27 in the direction toward the tray 1, and therefore it is ensured that the protrusion 27a of the switching member 27 fits in the recess 35. Further, the user is able to clearly perceive that the tray 1 is fully inserted in the main body 10.

Moreover, it is possible to prevent the tray 1 from being unintentionally pulled out of the main body 10 because of the vibration or the like. As a result, it is not necessary to provide an exclusive lock mechanism for the tray 1, and therefore the cost of the image forming apparatus can be reduced.

Additionally, the position of the tray 1 in the main body 10 is determined by the contact between the end surface 35a of the recess 35 and the contact surface 27b of the switching member 27. Thus, it is not necessary to provide exclusive positioning members for determining the position of the tray 1 in the main body 10 in the front-rear direction.

Embodiment 3.

Figure 13:
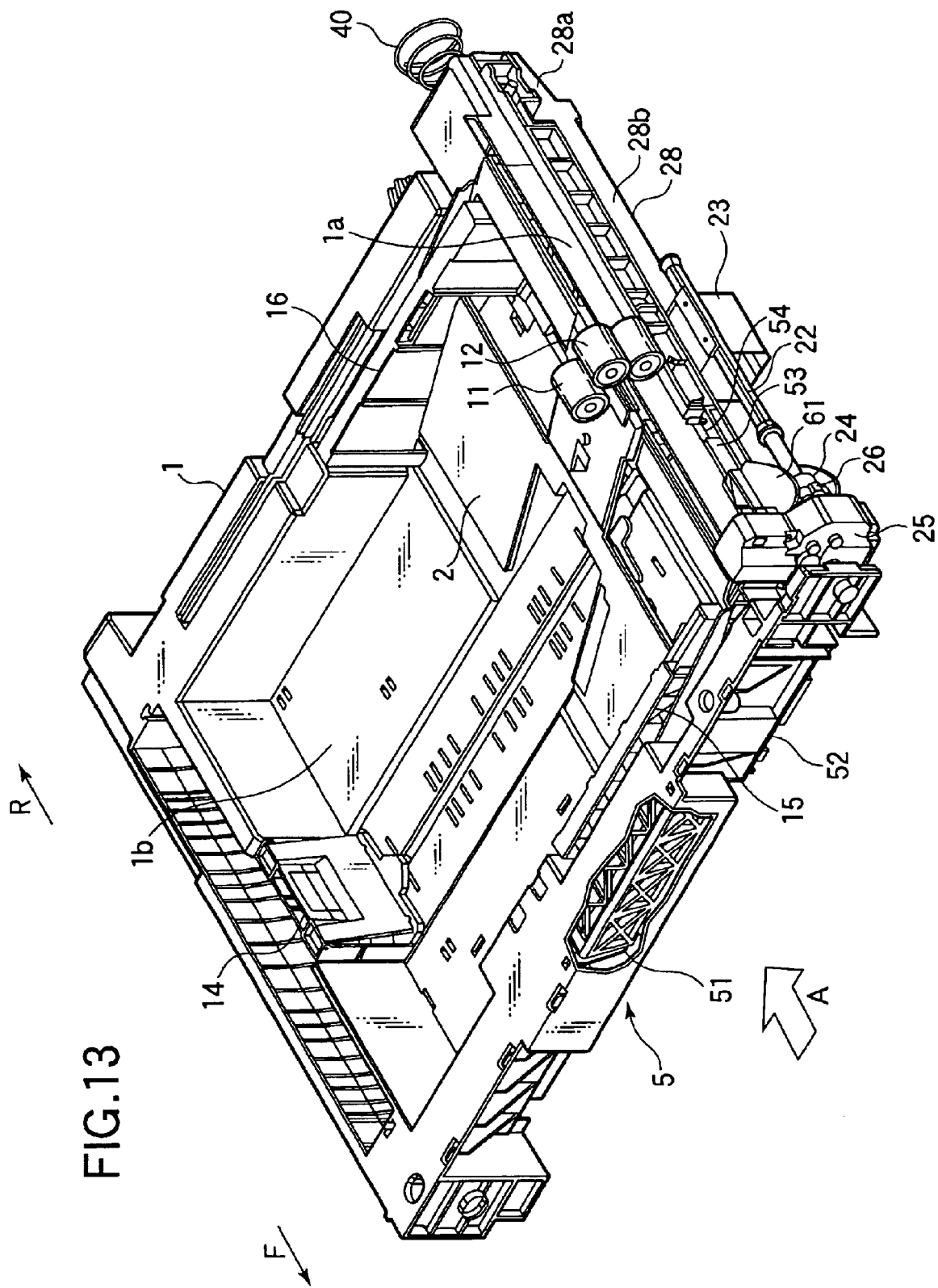
FIG. 13 is a perspective view of the sheet feeding mechanism according to Embodiment 3.

FIG. 13 is a perspective view of the sheet feeding mechanism according to Embodiment 3. In Embodiments 1 and 2, the switching member 27 is released from the recess 35 of the tray 1 by pulling the tray 1 in the direction B. However, in Embodiment 3, the switching member is released from the recess 35 by operating a release mechanism 5.

Figure 14:
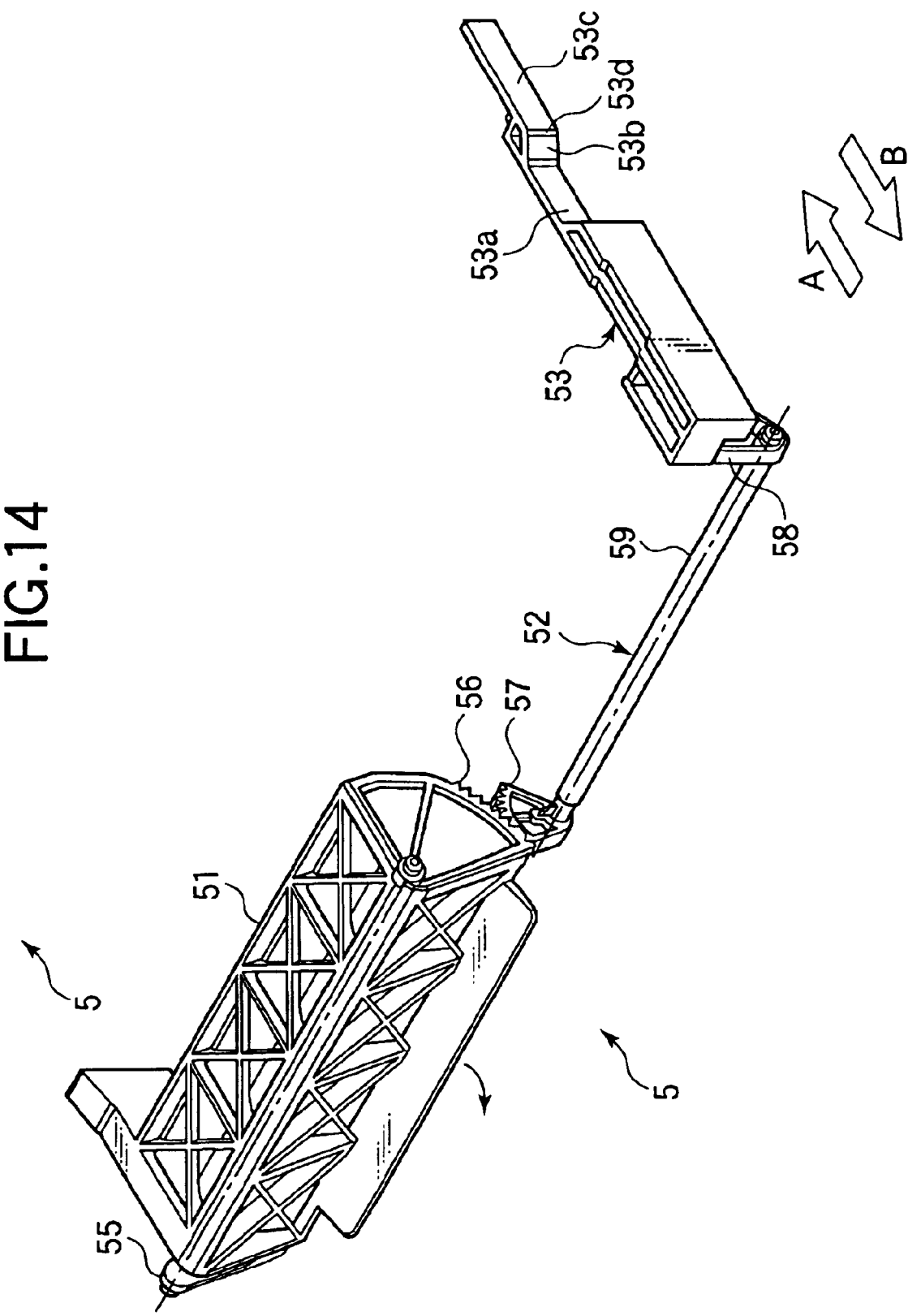
FIG. 14 is a perspective view of a release mechanism of the sheet feeding mechanism according to Embodiment 3.
Figure 15:
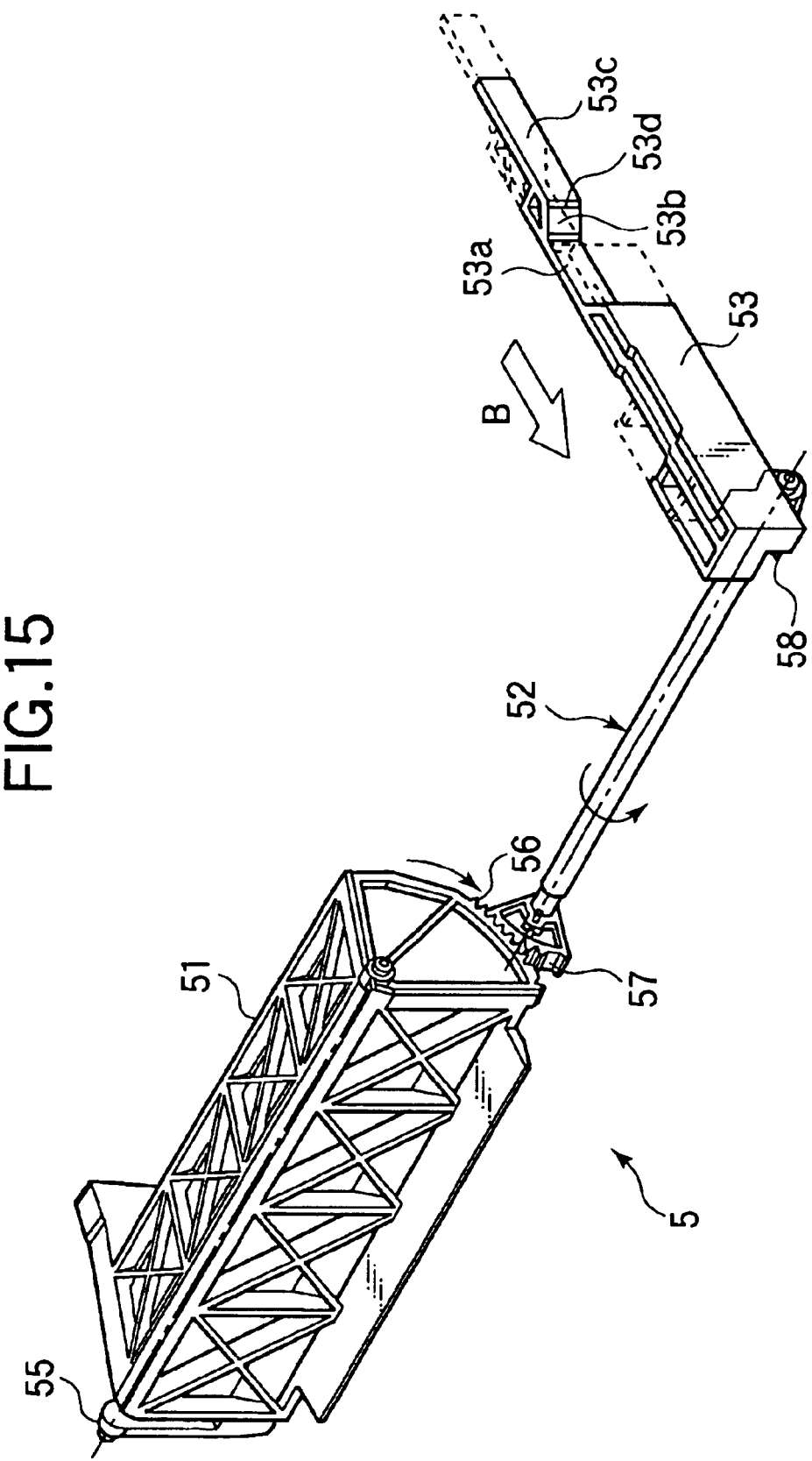
FIG. 15 is a perspective view illustrating the operation of the release mechanism according to Embodiment 3.

FIGS. 14 and 15 are perspective views of the release mechanism 5 according to Embodiment 3. As shown in FIG. 14, the release mechanism 5 includes a handle 51, a gear assembly 52, and a release member 53. The handle 51 is provided on the front side of the tray 1 (FIG. 13), so that the user is able to rotate the handle 51. The gear assembly 52 is provided in the front side of the tray 1 (FIG. 13) and is adjacent to the handle 51. The release member 53 is provided on the sheet feeding side 1a of the tray 1.

The handle 51 is rotatably supported by a shaft 55 that extends horizontally along the front side of the tray 1. The cross section of the handle 51 is in the shape of a sector. A sector gear 56 is formed on the longitudinal end (the lower-right end in FIG. 14) of the handle 51.

The gear assembly 52 has a rotation shaft 59 and two sector gears 57 and 58 fixed to both longitudinal ends of the rotation shaft 59. The rotation shaft 59 extends between the handle 51 and the release member 53. The sector gear 57 meshes with the sector gear 56 of the handle 51. The sector gear 58 meshes with a rack (not shown) formed on the release member 53. The release member 53 extends in the front-rear direction, and has a vertical flat surface 53c extending in parallel to the front-rear direction. The release member 53 has a recess 53a adjacent to the flat surface 53c. The recess 53a has a vertical end surface 53b formed at the rear end thereof. The end surface 53b is inclined with respect to the flat surface 53c. A ridge 53d is formed between the end surface 53b and the flat surface 53c. When the handle 51 rotates as shown in FIG. 15, the rotation of the handle 51 is transmitted to the release member 53, by means of the rotation shaft 59, the sector gears 56, 57 and 58, so that the release member 53 moves in the direction B.

Figure 16:
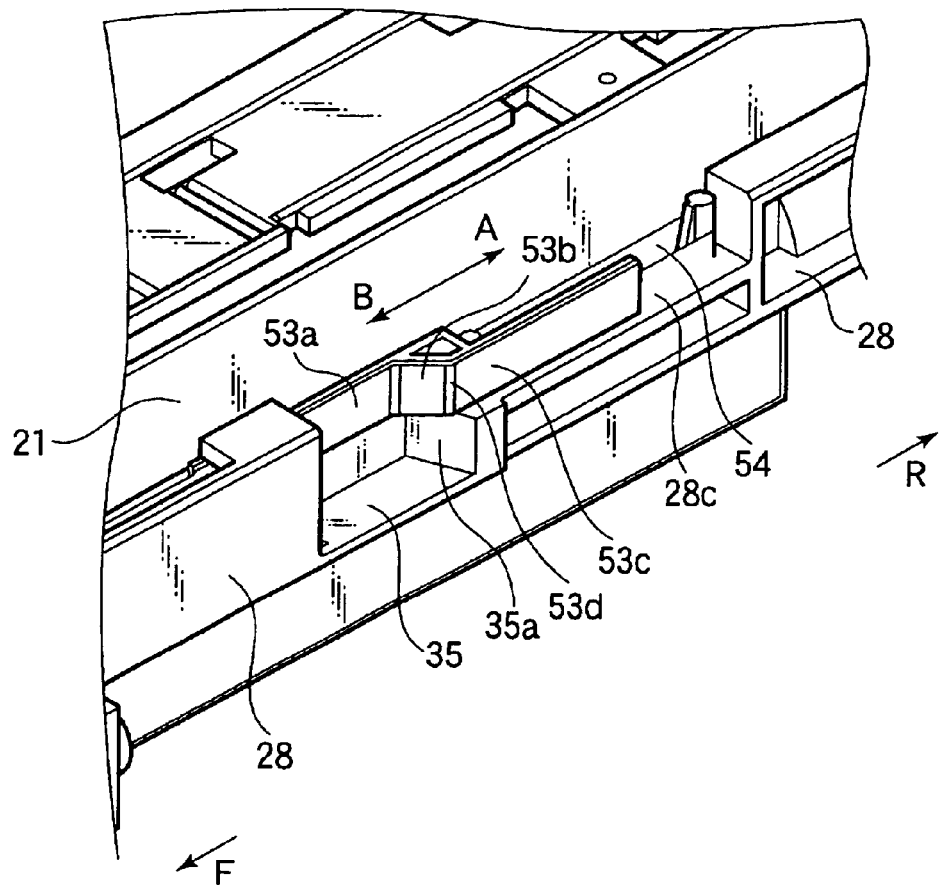
FIG. 16 is an enlarged perspective view of a release member of the release mechanism according to Embodiment 3.

FIG. 16 is a perspective view of the release member 53 and components around the release member 53. The release member 53 is slidably mounted on an upper part 28c of the guide bar 28 in such a manner that the release member 53 is slidable in the front-rear direction. The release member 53 is urged in the direction A by a tension spring 54. When the release member 53 is at its rear end position, the recess 53a is directly above the recess 35 of the guide bar 28. When the user rotates the handle 51 as shown in FIG. 15, the release member 53 moves in the direction B so that the end surface 53b moves in an area directly above the recess 35 of the guide bar 28.

Figure 17:
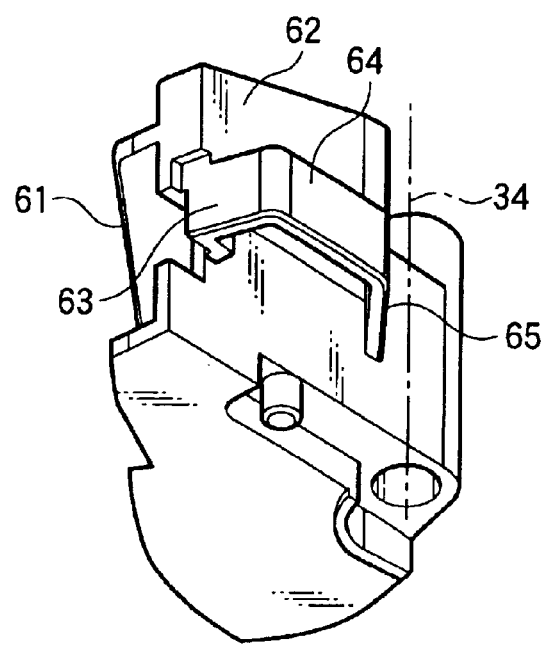
FIG. 17 is a perspective view of a switching member of the sheet feeding mechanism according to Embodiment 3.

FIG. 17 is a perspective view of a switching member 61 used in the Embodiment 3. The switching member 61 is rotatably supported by the vertical shaft 34. The switching member 61 has a protrusion 64 protruding toward the recess 35 of the tray 1. The protrusion 64 fits in the recess 35 (FIG. 16) of the guide bar 28 (FIG. 16) when the tray 1 is fully inserted in the main body 10. The protrusion 64 has a first contact surface 63 that abuts against the end surface 35a of the recess 35, when the protrusion 64 of the switching member 61 fits in the recess 35. When the tray 1 is fully inserted in the main body 10, the tray 1 is urged in the direction B by the second spring 40 (FIG. 13) as was also described in Embodiment 2, so that the first contact surface 63 of the switching member 61 abuts against the end surface 35a of the recess 35. By the contact between the first contact surface 63 of the switching member 61 and the end surface 35a of the recess 35, the position of the tray 1 in the main body 10 is determined in the front-rear direction. The protrusion 64 further has a contact surface 65 that contacts the end surface 28a of the guide bar 28 (FIG. 13).

The switching member 61 further has a second contact surface 62 directly above the protrusion 64. The second contact surface 62 abuts against the end surface 53b (or the ridge 53d) of the release member 53 when the release member 53 moves in the direction B in a state the protrusion 64 fits in the recess 35.

The angles of the first contact surfaces 63 and the second contact surface 62 are determined so that a force applied to the switching member 61 in the rotational direction caused by the contact between the second contact surface 62 and the release member 53 is greater than a force applied to the switching member 61 in the rotational direction caused by the contact between the first contact surface 63 and the end surface 35a of the recess 35. Accordingly, when the release member 53 moves in the direction B, the switching member 61 rotates in the direction in which the protrusion 64 moves out of the recess 35.

Figure 18:
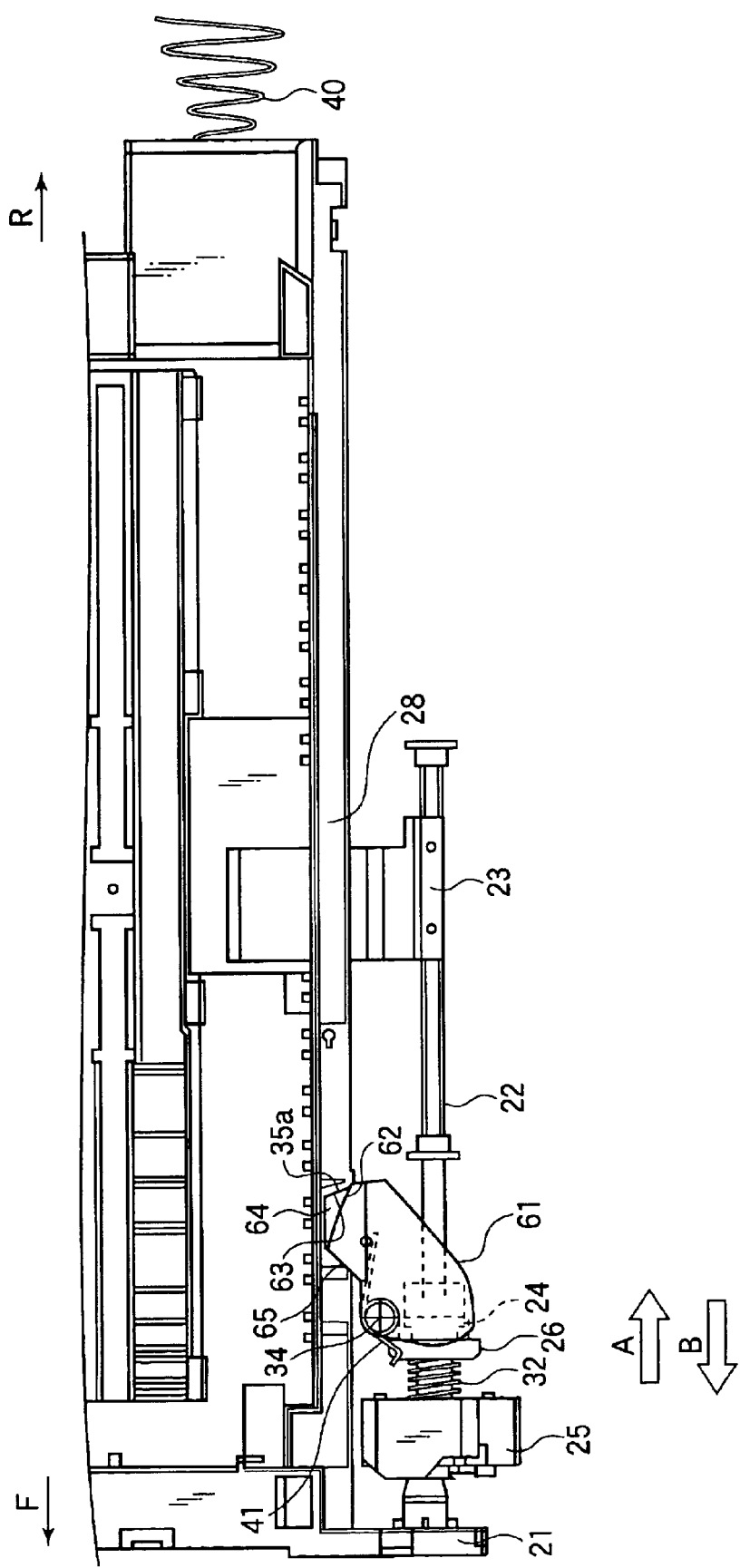
FIG. 18 is a plan view of the main part of the sheet feeding mechanism when the tray is fully inserted in the main body according to Embodiment 3.

The operation for inserting the tray 1 into the main body 10 will be described. FIG. 18 is a plan view of the main part of the sheet feeding mechanism when the tray 1 is fully inserted in the main body 10. The release member 53 is not shown in FIG. 18. When the user inserts the tray 1 into the main body 10 in the direction A, initially, the end surface 28a (FIG. 13) of the guide bar 28 abuts against the contact surface 65 of the switching member 61, so that the switching member 61 rotates in the direction away from the tray 1, and urges the first coupling 26 in the direction away from the second coupling 24 overcoming the force of the coil spring 32 and the first spring 41. As the first coupling 26 disengages from the second coupling 24, the power of the motor 25 is not transmitted to the shaft 22, so that the lifting plate 23 remains at the lower position 23L (FIG. 6).

When the user further inserts the tray 1 into the main body 10, the protrusion 64 of the switching member 61 fits in the recess 35 because of the force of the coil spring 32 and the first spring 41 as shown in FIG. 18. The user perceives a tactile response when the protrusion 64 fits in the recess 35, and recognizes that the tray 1 is fully inserted in the main body 10. When the user releases his hands from the tray 1, the tray 1 is pushed back by the second spring 40 until the end surface 35a of the recess 35 abuts against the first contact surface 63 of the switching member 61. Because of the contact between the end surface 35a of the recess 35 and the first contact surface 63 of the switching member 61, the position of the tray 1 in the main body 10 is determined in the front-rear direction. Further, the tray 1 is prevented from being dropped out of the main body 10. In other word, the tray 1 is locked in the main body 10. In this state, the handle 51 (FIG. 14) is not rotated by the user, and therefore the release member 53 (FIG. 16) is at its rear end position where the end surface 53b of the release member 53 does not abuts against the switching member 61.

As the protrusion 64 of the switching member 61 fits in the recess 35 of the tray 1, the first coupling 26 moves toward the second coupling 24 by the coil spring 41, so that the first coupling 26 engages the second coupling 24. Even if the convexes of the second coupling 24 initially do not fit in the concaves of the first coupling 26, the convexes of the second coupling 24 fit in the concaves of the first coupling 26 when the first coupling 26 starts rotating together with the motor 25 while the first coupling 26 is urged in the direction toward the second coupling 24 by the coil spring 32. After the first coupling 26 engages the second coupling 24, according to the rotation of the motor 25, the lifting member 23 urges the base plate 2 upward as was also described in Embodiment 1.

In the above operation, when the user inserts the tray 1 into the main body 10, the user must apply a sufficient force to the tray 1 for overcoming the force of the first spring 41, the second spring 40 and the coil spring 32, so that the user perceives the relatively large counterforce. Therefore, when the tray 1 is fully inserted in the main body 10, the user perceives that the counterforce decreases. As a result, the user is able to clearly recognize that the tray 1 is fully inserted in the main body 10.

Figure 19:
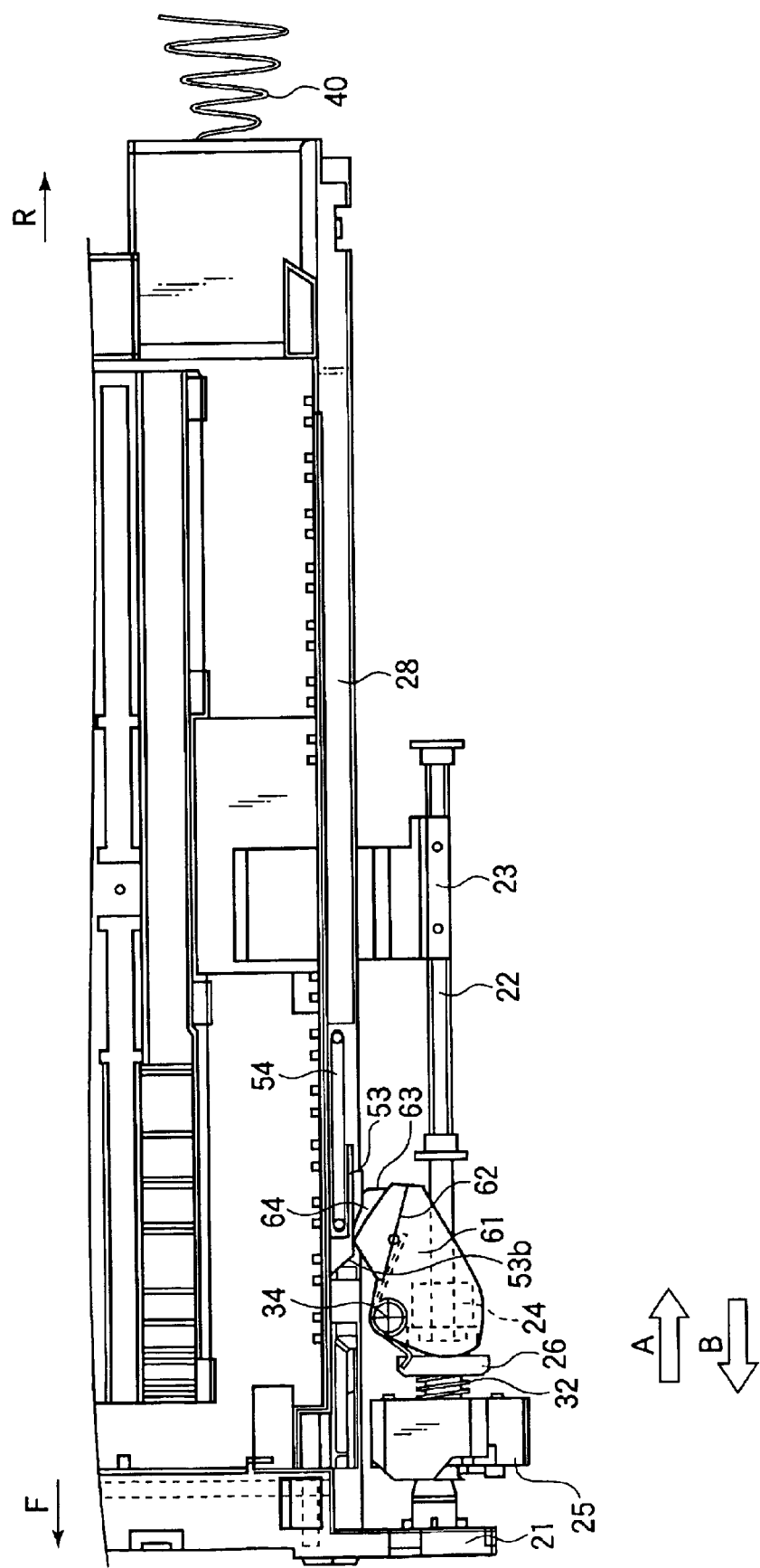
FIG. 19 is a plan view of the main part of the sheet feeding mechanism when the tray is being pulled out of the main body according to Embodiment 3.
Figure 20A:
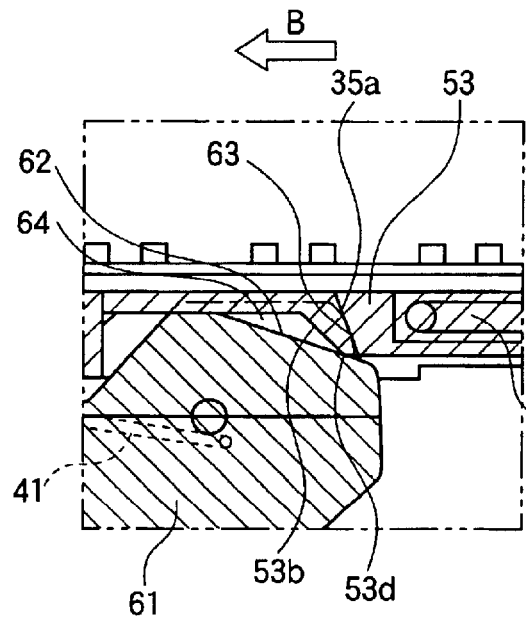
FIGS. 20A through 20D are schematic views illustrating the operation of the release mechanism of the sheet feeding mechanism according to Embodiment 3.
Figure 20B:
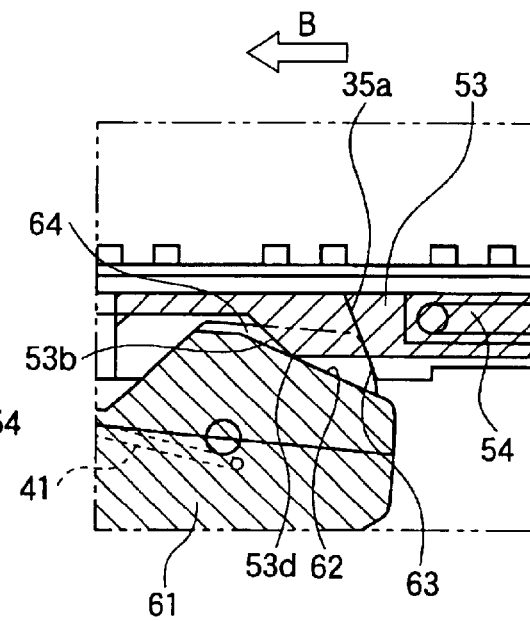
Figure 20C:
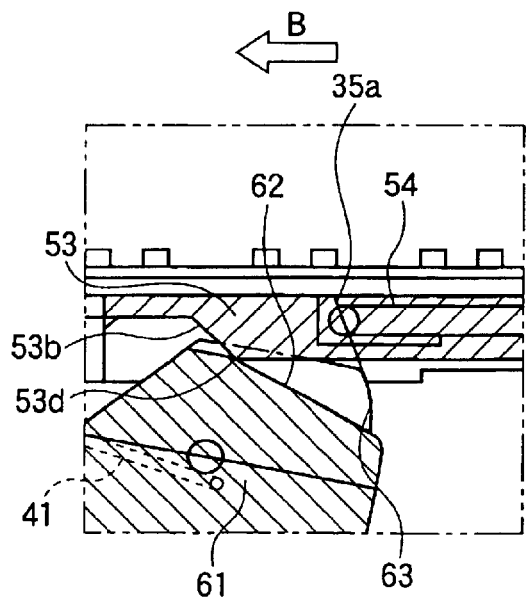
Figure 20D:
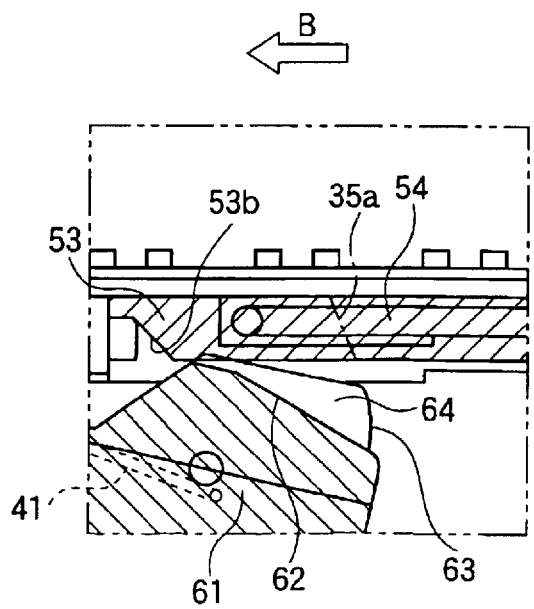

The operation for pulling the tray 1 out of the main body 10 will be described. FIG. 19 is a plan view of the main part of the sheet feeding mechanism when the tray 1 is being pulled out of the main body 10. FIGS. 20A through 20D are schematic views illustrating the contract between the switching member 61 and the release member 53 when the release mechanism 5 is operated. In a state where the tray 1 is fully inserted in the main body 10, the release member 53 does not abut against the second contact surface 62 of the switching member 61 as shown in FIG. 20A. When the user rotates the handle 51 in the direction indicated by an arrow in FIG. 15, the release member 53 moves in the direction B overcoming the force of the tension spring 54. Therefore, the end surface 53b (or the ridge 53d) of the release member 53 abuts against the second contact surface 62 of the switching member 61, so that the switching member 61 rotates in the direction in which the protrusion 64 moves out of the recess 35 as shown in FIG. 20B. As the release member 53 further moves in the direction B, the protrusion 64 moves out of the recess 35 as shown in FIGS. 20C and 20D. In this state, the lock of the tray 1 in the main body 10 is released.

As the protrusion 64 of the switching member 61 moves out of the recess 35, the switching member 61 urges the first coupling 26 in the direction away from the second coupling 24, as shown in FIG. 19. The first coupling 26 disengages from the second coupling 24, so that the power of the motor 25 is not transmitted to the shaft 22. Therefore, the lifting member 23 swings downward to the lower position 23L (FIG. 6), and the base plate 2 moves downward, so that the uppermost sheet of the stack on the base plate 2 separates from the pickup roller 11. The lifting member 23 does not interfere with the tray 1 being pulled out, so that the user is able to pull the tray 1 out of the main body 10.

In the above operation, when the user rotates the handle 51, the user must apply a sufficient force to the handle 51 for overcoming the force of the first spring 41 and the coil springs 32 and the tension spring 54, so that the user perceives the counterforce. Accordingly, when the protrusion 64 of the switching member 61 moves out of the recess 35, the user perceives that the counterforce decreases. As a result, the user is able to recognize that the switching member 61 moves out of the recess 35. In other word, the user is able to recognize that the lock of the tray 1 is released.

After the protrusion 64 moves out of the recess 35, no force is applied to the tray 1 in the direction A, and therefore the tray 1 slightly projects from the main body 10 by the force of the second spring 40. Then, the user is able to simply pulls the tray 1 out of the main body 10.

As described above, according to Embodiment 3, in addition to the advantages of Embodiment 2, the lock of the tray 1 in the main body 10 is released by operating the handle 51, and therefore it becomes easy to pull the tray 1 out of the main body 10.

Moreover, the tray 1 can not be pulled out without rotating the handle 51, and therefore it is possible to prevent the tray 1 from being unintentionally pulled out of the main body 10. In addition, it is possible to prevent the tray 1 from being dropped out of the main body 10 when the vibration is applied to the tray 1. Further, it is not necessary to provide an exclusive lock mechanism, with the result that it becomes possible to reduce the manufacturing cost and the size of the printer.

Embodiment 4.

Figure 21:
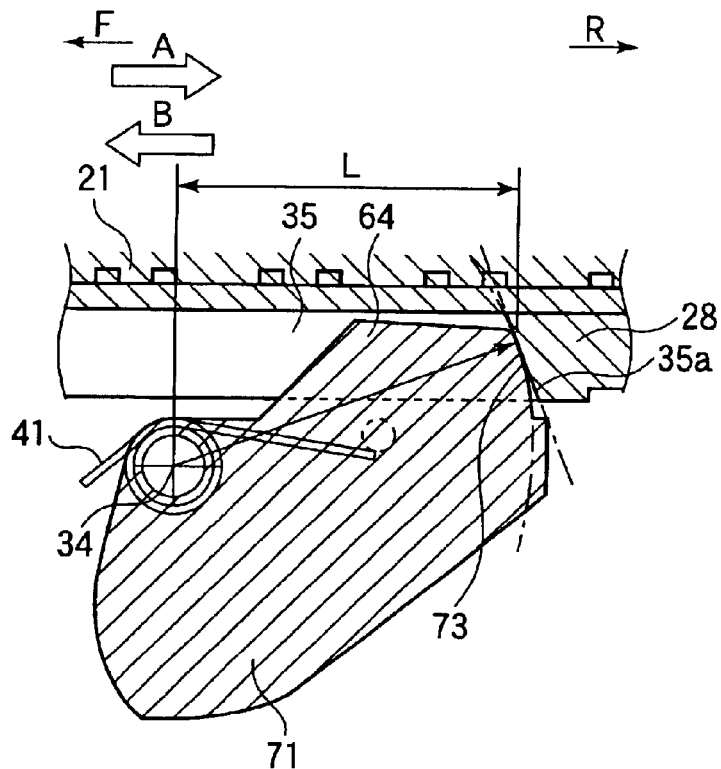
FIG. 21 is a horizontal cross section of the switching member according to Embodiment 4.

FIG. 21 is a horizontal cross section of a switching member 71 according to Embodiment 4. The structure of the switching member 71 is the same as that of the switching member 61 according to Embodiment 3, except the shape of a first contact surface 73.

As shown in FIG. 21, the first contact surface 73 has the shape of an arc as seen in the longitudinal direction of the vertical shaft 34 of the switching member 71. The center of the arc is aligned with the center of the vertical shaft 34 of the switching member 71. Further, the end surface 35*a* of the recess 35 of the tray 1 has the shape of a tangential line contacting the first contact surface 73 of the switching member 71 as seen in the longitudinal direction of the vertical shaft 34. Other components of the sheet feeding mechanism of Embodiment 4 are the same as those of Embodiment 3.

The tray 1 is urged in the direction B by means of the second spring 40 (FIG. 18) described in Embodiment 3. Further, the position of the tray 1 in the main body 10 is determined in the horizontal direction perpendicular to the front-rear direction by means of the positioning hole 38 and the boss 39 (FIG. 10). The switching member 71 is urged in the direction toward the tray 1 by the first spring 41.

When the user inserts the tray 1 into the main body 10, the protrusion 64 of the switching member 71 fits in the recess 35 because of the force of the coil spring 32 (FIG. 18) and the first spring 41. When the user releases his hands from the tray 1, the tray 1 is pushed back by the second spring 40 (FIG. 18) until the end surface 35*a* of the recess 35 abuts against the first contact surface 73 of the switching member 71. Because of the contact between the end surface 35*a* of the recess 35 and the first contact surface 73 of the switching member 71, the position of the tray 1 in the main body 10 is determined in the front-rear direction.

Figure 22:
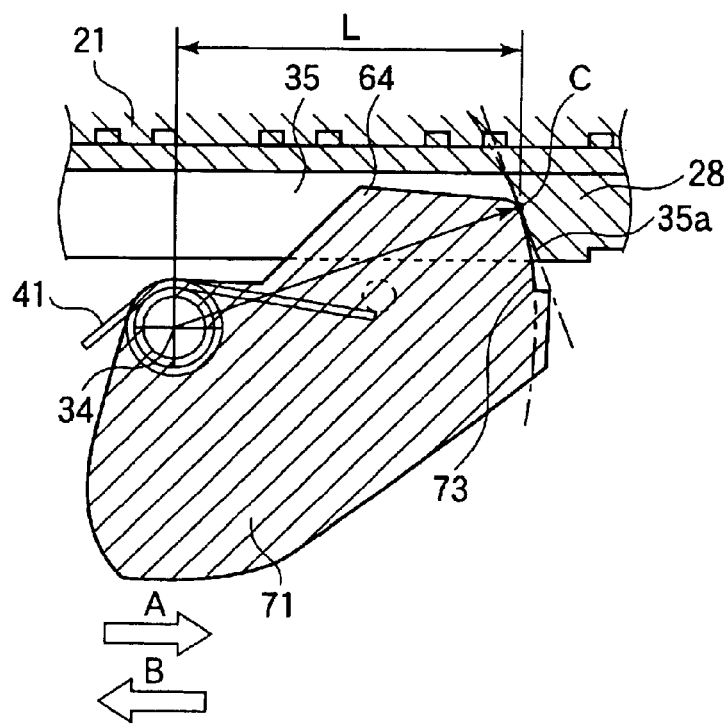
FIG. 22 is a horizontal cross section of the switching member when the switching member shallowly fits in a recess according to Embodiment 4.

In a state where the tray 1 is fully inserted in the main body 10, the position of the switching member 71 with respect to the recess 35 may deviate as shown in FIGS. 22 and 23. The protrusion 64 may shallowly fit in the recess 35 as shown in FIG. 22, and may deeply fit in the recess 35 as shown in FIG. 23. Such a deviation is caused by the deviation in the force applied to the tray 1 by the user for inserting the tray 1 in the main body 10, and the deviation in the dimensions of the first spring 41 and the second spring 40. The position of the tray 1 in the main body 10 depends on the distance L in the front-rear direction from the vertical shaft 34 to a contact point C where the first contact surface 73 contacts the end surface 35*a* of the recess 35. Thus, the above described deviation of the position of the switching member 71 in the recess 35 may cause a deviation of the position of the tray 1.

However, in Embodiment 4, the first contact surface 73 is formed in the shape of the arc, and the end surface 35*a* is formed in the shape of the tangential line as described above. Therefore, as schematically shown in FIGS. 24A and 24B, the contact position C does not change even if the protrusion 64 shallowly fits in the recess 35 (FIG. 24A) or deeply fits in the recess 35 (FIGS. 24B). Accordingly, the position of the tray 1 in the main body 10 can be kept constant even when the position of the protrusion 64 in the recess 35 deviates.

As described above, according to Embodiment 4, the position of the tray 1 can be kept constant even when the position of the protrusion 64 in the recess 35 deviates. As a result, it is possible to enhance the positioning accuracy of the sheet fed from the tray 1 to the main body 10, so that the image can be printed on the accurate position on the sheets.

In the above described Embodiments, the sheet feeding mechanism is employed in the electro-photographic printer. However, the sheet feeding mechanism of the present invention can be applied to other type of apparatus, for example, a copier.

Further, in the above described Embodiments, the transmission between the motor 25 and the shaft 22 is disconnected when the tray 1 is to be pulled out of the main body 10 in the embodiments. However, it is possible to employ another arrangement for moving the lifting member 23 out of the tray 1 when the tray 1 is to be pulled out of the main body 10.

Moreover, the present invention can be applied to sheet feeding mechanism having a type of tray which is not removable but can be simply drawn from the main body.

Although the terms "front" and "rear" are used in the description above, these terms are used for convenience of description. These terms are not intended to restrict the actual directions when the image forming apparatus is used.

While the preferred embodiments of the present invention have been illustrated in detail, it should be apparent that modifications and improvements may be made to the invention without departing from the spirit and scope of the invention as described in the following claims.

What is claimed is:

1. A sheet feeding mechanism used in an apparatus, said sheet feeding mechanism comprising:

a tray that can be inserted in and pulled out of a main body of said apparatus, said tray accommodating a stack of sheets;

a lifting member provided in said main body so that said lifting member is able to move in said tray to lift said stack accommodated in said tray; and a driving mechanism provided in said main body, said driving mechanism driving said lifting member to lift said stack accommodated in said tray when said tray is in a first position in said main body, and said driving mechanism moving said lifting member out of said tray in response to said tray being pulled out from said first position toward a second position in said main body.

2. The sheet feeding mechanism according to claim 1, wherein said driving mechanism comprises:
   a driving source;
   a transmission that transmits a power of said driving source to said lifting member; and
   a switching member movable in response to the movement of said tray, said switching member connecting said transmission when said tray reaches said first position in said main body.

3. The sheet feeding mechanism according to claim 2, wherein said switching member disconnects said transmission when said tray moves out of said first position.

4. The sheet feeding mechanism according to claim 2, wherein said tray has a recess, and wherein said switching member fits in said recess when said tray reaches said first position, so as to connect said transmission.

5. The sheet feeding mechanism according to claim 4, further comprising a first resilient member that urges said switching member in a direction in which said switching member is inserted in said recess.

6. The sheet feeding mechanism according to claim 5, further comprising a second resilient member that urges said tray in a direction in which said tray is pulled out of said main body into said second position.

7. A sheet feeding mechanism used in an apparatus, said sheet feeding mechanism comprising:
   a tray that can be inserted in and pulled out of a main body of said apparatus, said tray accommodating a stack of sheets;
   a lifting member provided in said main body so that said lifting member is able to move in said tray to lift said stack accommodated in said tray;
   a driving mechanism provided in said main body, said driving mechanism driving said lifting member to lift said stack accommodated in said tray in a state where said tray is inserted in said main body; and
   a release mechanism including a handle provided on said tray, said handle being operated for pulling said tray out of said main body, wherein said driving mechanism moves said lifting member out of said tray when said handle is operated.

8. The sheet feeding mechanism according to claim 7, wherein said driving mechanism comprises:
   a driving source;
   a transmission that transmits a power of said driving source to said lifting member; and
   a switching member that connects said transmission when said tray reaches a predetermined position in said main body,
   wherein said release mechanism further comprises a release member movable in response to said handle, said release member moves said switching member to disconnect said transmission.

9. The sheet feeding mechanism according to claim 8, wherein said tray has a recess, and said switching member fits in said recess when said tray reaches said predetermined position, so as to connect said transmission, and
   wherein said switching member has a first contact surface that contacts a part of said recess when said drive member fits in said recess, so as to determine a position of said tray in said main body.

10. The sheet feeding mechanism according to claim 9, wherein said switching member is rotatable about a rotation axis, and
    wherein said first contact surface has the shape of an arc as seen in the direction of said rotation axis, and said part of said recess has the shape of a tangential line contacting said arc as seen in the direction of said rotation axis.

11. The sheet feeding mechanism according to claim 10, wherein said switching member has a second contact surface that contacts said release member when said release member moves said switching member out of said recess.

12. The sheet feeding mechanism according to claim 8, wherein said switching member contacts said tray when said tray reaches said predetermined position so as to determine a position of said tray in said main body.

13. The sheet feeding mechanism according to claim 12, wherein said switching member has a first contact surface that contacts said tray to determine a position of said tray in said main body and a second contact surface that contacts said release member when said release member moves said switching member for disconnecting said transmission, and
    wherein said first and second contact surfaces have different angles with respect to a direction in which said release member moves.

14. The sheet feeding mechanism according to claim 13, wherein said switching member is rotatable about a rotation axis, and
    wherein angles of said first and second contact surfaces are determined so that a force applied to said switching member in the rotational direction of said switching member caused by the contact between said second contact surface and said release member is greater than a force applied to said switching member in said rotational direction caused by the contact between said first contact surface and said tray.

15. An image forming apparatus comprising:
    a main body;
    a tray that can be inserted in and pulled out of said main body, said tray accommodating a stack of sheets;
    a lifting member provided in said main body so that said lifting member is able to move in said tray to lift said stack accommodated in said tray; and
    a driving mechanism provided in said main body, said driving mechanism driving said lifting member to lift said stack accommodated in said tray when said tray is in a first position in said main body, and said driving mechanism moving said lifting member out of said tray in response to said tray being pulled out from said first position toward a second position in said main body.

16. The image forming apparatus according to claim 15, wherein said driving mechanism comprises:
    a driving source;
    a transmission that transmits a power of said driving source to said lifting member; and
    a switching member movable in response to the movement of said tray, said switching member connecting said transmission when said tray reaches said first position in said main body.

17. The image forming apparatus according to claim 16, wherein said switching member disconnects said transmission when said tray moves out of said first position.

18. The image forming apparatus according to claim 16, wherein said tray has a recess, and wherein said switching member fits in said recess when said tray reaches said first position, so as to connect said transmission.

19. An image forming apparatus comprising:

a main body;

a tray that can be inserted in and pulled out of said main body, said tray accommodating a stack of sheets;

a lifting member provided in said main body so that said lifting member is able to move in said tray to lift said stack accommodated in said tray;

a driving mechanism provided in said main body, said driving mechanism driving said lifting member to lift said stack accommodated in said tray in a state where said tray is inserted in said main body; and a release mechanism including a handle provided on said tray, said handle being operated for pulling said tray out of said main body, wherein said driving mechanism moves said lifting member out of said tray when said handle is operated.

20. The image forming apparatus according to claim 19, wherein said driving mechanism comprises:

a driving source;

a transmission that transmits a power of said driving source to said lifting member; and a switching member that connects said transmission when said tray reaches a predetermined position in said main body, wherein said switching member contacts said tray when said tray reaches said predetermined position in said main body, so as to determine a position of said tray in said main body; and wherein said release mechanism further comprises a release member movable in response to said handle, said release mechanism moves said switching member to disconnect said transmission.

21. A sheet feeding mechanism used in an apparatus, said sheet feeding mechanism comprising:

a tray that can be inserted in and pulled out of a main body of said apparatus, said tray accommodating a stack of sheets;

a lifting member provided in said main body so that said lifting member is able to move in said tray to lift said stack accommodated in said tray;

a driving source provided in said main body; and a switching mechanism that connects a transmission between said driving source and said lifting member when said tray is in a first position in said main body;

wherein, when said tray is inserted in said main body, said switching mechanism disconnects said transmission before said tray is inserted to said first position in said main body.

22. The sheet feeding mechanism according to claim 21, wherein said tray has a recess, and said switching mechanism has a switching member that engages recess when said tray is in said first position, wherein, when said switching member engages said recess, said switching mechanism connects said transmission.

23. An image forming apparatus comprising:

a main body;

a tray that can be inserted in and pulled out of a main body of said apparatus, said tray accommodating a stack of sheets;

a lifting member provided in said main body so that said lifting member is able to move in said tray to lift said stack accommodated in said tray;

a driving source provided in said main body; and a switching mechanism that connects a transmission between said driving source and said lifting member when said tray is in a first position in said main body;

wherein, when said tray is inserted in said main body, said switching mechanism disconnects said transmission before said tray is inserted to said first position in said main body.

24. The image forming apparatus according to claim 23, wherein said tray has a recess, and said switching mechanism has a switching member that engages said recess when said tray is in said first position, wherein, when said switching member engages said recess, said switching mechanism connects said transmission.

25. The image forming apparatus according to claim 24, wherein said switching member contacts said tray so as to determine the position of said tray with respect to said main body when said tray is in said first position.

* * * * *